(12) United States Patent
Hundley et al.

(10) Patent No.: US 12,116,653 B2
(45) Date of Patent: Oct. 15, 2024

(54) FUNCTIONALIZED ASPHERICAL POWDER FEEDSTOCKS AND METHODS OF MAKING THE SAME

(71) Applicant: HRL Laboratories, LLC, Malibu, CA (US)

(72) Inventors: Jacob M. Hundley, Thousand Oaks, CA (US); Brennan D. Yahata, Los Angeles, CA (US); John H. Martin, Oxnard, CA (US); Tobias A. Schaedler, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 35 days.

(21) Appl. No.: 17/026,218

(22) Filed: Sep. 19, 2020

(65) Prior Publication Data
US 2021/0146439 A1    May 20, 2021

Related U.S. Application Data

(60) Provisional application No. 62/936,713, filed on Nov. 18, 2019.

(51) Int. Cl.
*B22F 1/16* (2022.01)
*B22F 1/05* (2022.01)
(Continued)

(52) U.S. Cl.
CPC ................. *C22C 1/05* (2013.01); *B22F 1/05* (2022.01); *B22F 1/054* (2022.01); *B22F 1/062* (2022.01);
(Continued)

(58) Field of Classification Search
None
See application file for complete search history.

(56) References Cited

U.S. PATENT DOCUMENTS

| | | | | |
|---|---|---|---|---|
| 4,915,605 A | * | 4/1990 | Chan | ......................... B22F 3/15 |
| | | | | 419/49 |
| 2010/0032064 A1 | * | 2/2010 | Dreizin | ................... C06B 43/00 |
| | | | | 149/37 |

(Continued)

OTHER PUBLICATIONS

Li, S. et al., "Maximum packing densities of basic 3D objects", Chinese Science Bulletin, vol. 55, No. 2, pp. 114-119, Jan. 2010.*

(Continued)

*Primary Examiner* — George Wyszomierski
(74) *Attorney, Agent, or Firm* — O'Connor & Company; Ryan P. O'Connor

(57) ABSTRACT

This disclosure provides an improvement over the state of the art by teaching a low-cost method to produce feedstock powder, without undergoing a phase change, from industrially relevant wrought alloys that are widely available at low cost. The surfaces of aspherical particles are functionalized with particulates having a different size and composition than the particles, to control the solidification response of the feedstock. Some variations provide a metal-containing functionalized material comprising: a plurality of aspherical particles comprising a metal or a metal alloy; and a plurality of metal-containing or ceramic particulates that are assembled on surfaces of the aspherical particles, wherein the particulates are compositionally different than the aspherical particles. Methods of making and using the metal-containing functionalized materials are described. The invention provides an economic advantage over traditional gas-atomized or water-atomized metal powder feedstocks for powder-based metal additive manufacturing or other powder metallurgy processes.

11 Claims, 10 Drawing Sheets

(51) Int. Cl.
| | |
|---|---|
| *B22F 1/054* | (2022.01) |
| *B22F 1/062* | (2022.01) |
| *B22F 1/068* | (2022.01) |
| *B22F 1/145* | (2022.01) |
| *B22F 1/17* | (2022.01) |
| *B22F 9/04* | (2006.01) |
| *C22C 1/05* | (2023.01) |

(52) U.S. Cl.
CPC ............. *B22F 1/068* (2022.01); *B22F 1/145* (2022.01); *B22F 1/16* (2022.01); *B22F 1/17* (2022.01); *B22F 9/04* (2013.01); *B22F 2009/043* (2013.01); *B22F 2009/045* (2013.01); *B22F 2304/05* (2013.01); *B22F 2304/10* (2013.01); *B22F 2304/15* (2013.01); *B22F 2998/10* (2013.01)

(56) References Cited

U.S. PATENT DOCUMENTS

| | | | |
|---|---|---|---|
| 2018/0214949 A1* | 8/2018 | Martin | B22F 10/20 |
| 2018/0214991 A1 | 8/2018 | Yahata et al. | |
| 2019/0194481 A1* | 6/2019 | Iacob | C09D 11/102 |
| 2020/0332127 A1* | 10/2020 | Schilling | H01B 1/22 |

OTHER PUBLICATIONS

Loftus, H.J. et al., "Powder Rocket Feasibility Evaluation", Prepared for Air Force Rocket Propulsion Laboratory, Distributed by National Technical Information Service, U.S. Department of Commerce, Apr. 1973.*

ASM Handbook, vol. 2A, Aluminum Science and Technology, "Aluminum Alloy Nomenclature and Temper Designations", Revised by John Weritz, ASM International, 2018.*

Komazaki, S. et al., "Evaluation of Susceptibility to Hydrogen Embrittlement of 7075 Aluminum Alloy by Hydrogen Addition Using Flax-Treatment Method", Materials Transactions, vol. 47, No. 8, pp. 1994-1998, published Aug. 15, 2006.*

Takano, N., "Hydrogen diffusion and embrittlement in 7075 aluminum alloy", Materials Science and Engineering A, vol. 483-484, pp. 336-339, 2008.*

Qi, W.J. et al., "Study on mechanical properties and hydrogen embrittlement susceptibility of 7075 aluminium alloy", Corrosion Engineering, Science and Technology, vol. 50, No. 6, pp. 480-486, 2015.*

PCT/US2020/051699 Written Opinion of the International Search Authority, dated Dec. 15, 2020.

Asgari et al., "On microstructure and mechanical properties of additively manufactured AlSi10Mg_200C using recycled powder", Materials Science & Engineering A 707 (2017) 148-158.

Liu et al., "Preparation of superfine-grained high entropy alloy by spark plasma sintering gas atomized powder", Intermetallics 68 (2016) 16-22.

Murr et al., "Characterization of titanium aluminide alloy components fabricated by additive manufacturing using electron beam melting", Acta Materialia 58 (2010) 1887-1894.

Strondl et al., "Characterization and Control of Powder Properties for Additive Manufacturing", JOM, vol. 67, No. 3 (2015) 549-554.

Jolly et al., "Modelling of defects in aluminium cast products", Progress in Materials Science 123 (2022) 100824.

\* cited by examiner

FUNCTIONALIZED ASPHERICAL POWDER FEEDSTOCKS AND METHODS OF MAKING THE SAME

PRIORITY DATA

This patent application is a non-provisional application with priority to U.S. Provisional Patent App. No. 62/936,713, filed on Nov. 18, 2019, which is hereby incorporated by reference herein.

FIELD OF THE INVENTION

The present invention generally relates to powder-based additive manufacturing processes and other powder-based metallurgy processes, and metal-containing functionalized materials that may be used in such processes.

BACKGROUND OF THE INVENTION

Metal-based additive manufacturing, or three-dimensional (3D) printing, has applications in many industries, including the aerospace and automotive industries. Building up metal components layer-by-layer increases design freedom and manufacturing flexibility, thereby enabling complex geometries while eliminating traditional economy-of-scale constraints. In metal-based additive manufacturing, application of a direct energy source, such as a laser or electron beam, to melt alloy powders locally results in solidification rates between 0.01 m/s and 5 m/s, an order of magnitude increase over conventional casting processes.

Additive manufacturing allows for one-step fabrication of complex parts of arbitrary design. Additive manufacturing eliminates the need for assembling multiple components, while minimizing manufacturing time and wastage of materials and energy that is often associated with traditional manufacturing (e.g. machining or forging). Although additive manufacturing is rapidly growing to produce metallic, polymeric, and ceramic components, production of metallic parts is its fastest growing sector.

Commercial powder metallurgy processes typically employ gas-atomized or water-atomized melted powders in which the particle morphology is controlled during the atomization process to render a spherical or nearly spherical geometry. For example, in powder-bed metal additive-manufacturing processes, spherical, atomized, monodisperse powder feedstocks are used to control the flow of powder. Multiple thin layers of powder are spread across a surface, melted, and solidified.

The use of gas-atomized or water-atomized metal alloy feedstock powders is well-known. See Liu et al., "Preparation of superfine-grained high entropy alloy by spark plasma sintering gas atomized powder", *Intermetallics* 68 (2016) 16-22; and Murr et al., "Characterization of titanium aluminide alloy components fabricated by additive manufacturing using electron beam melting", *Acta Materialia* 58 (2010) 1887-1894, which are hereby incorporated by reference. These feedstocks are formed by starting from a melt and spraying the liquefied material into a controlled fluid flow by means of a specially designed nozzle. Upon exposure to a second fluid, the liquefied metal undergoes a phase change and solidifies, collecting at the bottom of the chamber or in a secondary containment vessel. Powders formed this way are then sieved to remove any oversized or undersized material, leading to low yields of about 25-35% on the basis of input material.

Despite the unique thermochemical processing conditions in additive manufacturing or other powder metallurgy processes, the feedstock powders are generally chosen from conventional cast or wrought alloys. Gas atomization has historically been the only way to obtain feedstocks of these alloys in powder form.

However, it is well-understood that melt atomization of fine (less than 65 microns) and monodisperse (15-60 microns) spherical powders from a bulk ingot is incredibly expensive in comparison to traditional subtractive manufacturing processes. As an example, aluminum alloys typically cost $2-5 per kg depending on composition, whereas atomized aluminum powders are only industrially available at a high cost of $45-300 per kg. The significant price discrepancy between raw materials and atomized powder has thus far limited the utility and implementation of metal additive manufacturing and relegated it to prototypes or high-margin components (e.g. satellite or spacecraft structures) in which manufacturing cost is not a significant design driver.

Yet, in many commercial applications, performance and cost are considered equivalent or near-equivalent design drivers. There is a real need for a paradigm shift in order to break the current trade-off involving material cost versus component performance in powder-based additive manufacturing and other powder metallurgy processes.

SUMMARY OF THE INVENTION

The present invention addresses the aforementioned needs in the art, as will now be summarized and then further described in detail below.

Some variations provide a metal-containing functionalized material comprising:

(a) a plurality of aspherical particles comprising a metal or a metal alloy; and (b) a plurality of particulates (i.e., functionalization particulates) that are physically and/or chemically assembled on surfaces of the aspherical particles, wherein the particulates are selected from the group consisting of metals, metal alloys, metal carbides, metal nitrides, metal borides, metal hydrides, metal oxides, metal sulfides, ceramics, and combinations thereof, wherein the particulates are compositionally different than the aspherical particles, and wherein the particulates have an average particulate size that is different than an average aspherical-particle size of the aspherical particles.

In some embodiments, the aspherical particles are selected from whiskers, needles, rods, fibers, fractured chips, deformed ribbons, oblate spheroids, prolate spheroids, parallelepipeds, rhomboids, rectangular prisms, platelets, faceted particles, randomly shaped particles, and/or combinations thereof.

In some embodiments of the metal-containing functionalized material, the aspherical particles are characterized by a packing efficiency from 40% to 65%, such as 40-49%, 49-55%, 55-60%, or 60-65%. In certain embodiments, the packing efficiency is less than 64%. In certain cases with random shapes, the packing efficiency is less than 40%. In certain embodiments, a combination of shapes and sizes leads to a packing efficiency >65%.

The aspherical particles may be characterized by a median particle size (D50) from 5 microns (μm) to 10 millimeters (mm), such as for the largest particle axis. For example, the median particle size may be within the range 15-45 μm, 40-70 μm, 70-125 μm, 125-300 μm, 300-600 μm, or 600-10000 μm, for example.

The average functionalization particulate size may be from 5 nanometers (nm) to 100 μm, for example. Typically, the average particulate size is smaller than the average aspherical-particle size. In some embodiments, the average particulate size is at least an order of magnitude smaller than the average aspherical-particle size. In other embodiments, the average particulate size is the same as, or larger than, the average aspherical-particle size.

In some embodiments, the particulates form a continuous coating on the aspherical particles. In other embodiments, the particulates form a discontinuous coating on the aspherical particles.

In some embodiments, the aspherical particles contain a metal selected from the group consisting of aluminum, titanium, cobalt, chromium, iron, copper, tungsten, magnesium, niobium, nickel, tantalum, silicon, vanadium, gold, silver, platinum, palladium, iridium, rhenium, zinc, cerium, molybdenum, zirconium, hafnium, and alloys or combinations thereof. Additional alloying elements may also be present.

In some embodiments, the particulates contain a metal selected from the group consisting of aluminum, titanium, cobalt, zinc, tin, chromium, bismuth, neodymium, dysprosium, erbium, samarium, praseodymium, gadolinium, ytterbium, lanthanum, boron, lithium, calcium, strontium, scandium, yttrium, manganese, rhenium, iridium, lead, carbon, indium, gallium, iron, copper, tungsten, magnesium, niobium, nickel, tantalum, silicon, vanadium, gold, silver, palladium, platinum, cerium, zirconium, hafnium; carbides, nitrides, borides, hydrides, intermetallics, oxides, or sulfides thereof; and combinations of the foregoing.

In some embodiments, the metal-containing functionalized material further comprises a spherical metal or metal alloy powder.

The metal-containing functionalized material does not necessarily only contain the aspherical particles and the particulates. Other materials may be present. In some embodiments, the combined concentration of the aspherical particles and the particulates is from 50 vol % to 100 vol % of the metal-containing functionalized material. The combined concentration of the aspherical particles and the particulates may be in various ranges, such as 50-60 vol %, 60-74 vol %, 75-85 vol %, 85-95% vol, greater than 95 vol %, greater than 99% vol, less than 50 vol %, or less than 100 vol %. In certain embodiments, the combined concentration of the aspherical particles and the particulates is 100 vol %—that is, the metal-containing functionalized material consists of aspherical particles and functionalization particulates.

Some variations of the invention provide a method of fabricating a metal-containing functionalized material, the method comprising:

(a) providing a bulk feedstock containing a metal or a metal alloy;

(b) mechanically milling and/or chemically milling the bulk feedstock to generate a plurality of aspherical particles comprising the metal or metal alloy, wherein the aspherical particles are smaller than the length scale of the bulk feedstock;

(c) providing particulates selected from the group consisting of metals, metal alloys, metal carbides, metal nitrides, metal borides, metal hydrides, metal oxides, metal sulfides, ceramics, and combinations thereof, wherein the particulates are compositionally different than the aspherical particles; and (d) physically and/or chemically assembling the particulates onto surfaces of the aspherical particles, wherein the particulates have an average particulate size that is different than an average aspherical-particle size of the aspherical particles.

In some method embodiments, the mechanically milling and/or chemically milling causes essentially no solid-liquid phase change of the metal or metal alloy. The mechanically milling and/or chemically milling may utilize mechanical milling selected from the group consisting of ball milling, fracturing, grinding, pulverizing, attrition milling, high-shear mixing, vibratory mixing, acoustic mixing, and combinations thereof. Alternatively, or additionally, the mechanically milling and/or chemically milling may utilize chemical milling selected from the group consisting of etching, dealloying, acid treatment, base treatment, and combinations thereof.

In some embodiments, the bulk feedstock is in the form of a plate, a sheet, an ingot, an extrudate, or a combination thereof. In some embodiments, the bulk feedstock comprises forgings, castings, semi-finished parts, machine-shop prototypes, low-quality parts, rejected parts, damaged parts, metal scrap, machining chips, recycled components, or a combination thereof.

In some embodiments, the aspherical particles include whiskers, needles, rods, fibers, oblate spheroids, prolate spheroids, parallelepipeds, rhomboids, rectangular prisms, platelets, faceted particles, randomly shaped particles, or a combination thereof. The aspherical particles may be characterized by a median particle size (D50) from 10 microns to 1 millimeter, for example. The average particulate size may be from 5 nanometers to 100 microns, for example. Typically, the average particulate size is smaller than the average aspherical-particle size, although that is not necessarily the case.

In some methods, the aspherical particles contain a metal selected from the group consisting of aluminum, titanium, cobalt, chromium, iron, copper, tungsten, magnesium, niobium, nickel, tantalum, silicon, vanadium, gold, silver, cerium, molybdenum, zirconium, hafnium, and combinations thereof.

In some methods, the particulates contain a metal selected from the group consisting of aluminum, titanium, cobalt, zinc, tin, chromium, iron, copper, tungsten, magnesium, niobium, nickel, tantalum, silicon, vanadium, gold, silver, palladium, platinum, cerium, zirconium, hafnium; carbides, nitrides, borides, hydrides, oxides, or sulfides thereof; and combinations of the foregoing.

DETAILED DESCRIPTION OF EMBODIMENTS OF THE INVENTION

Figure 1:
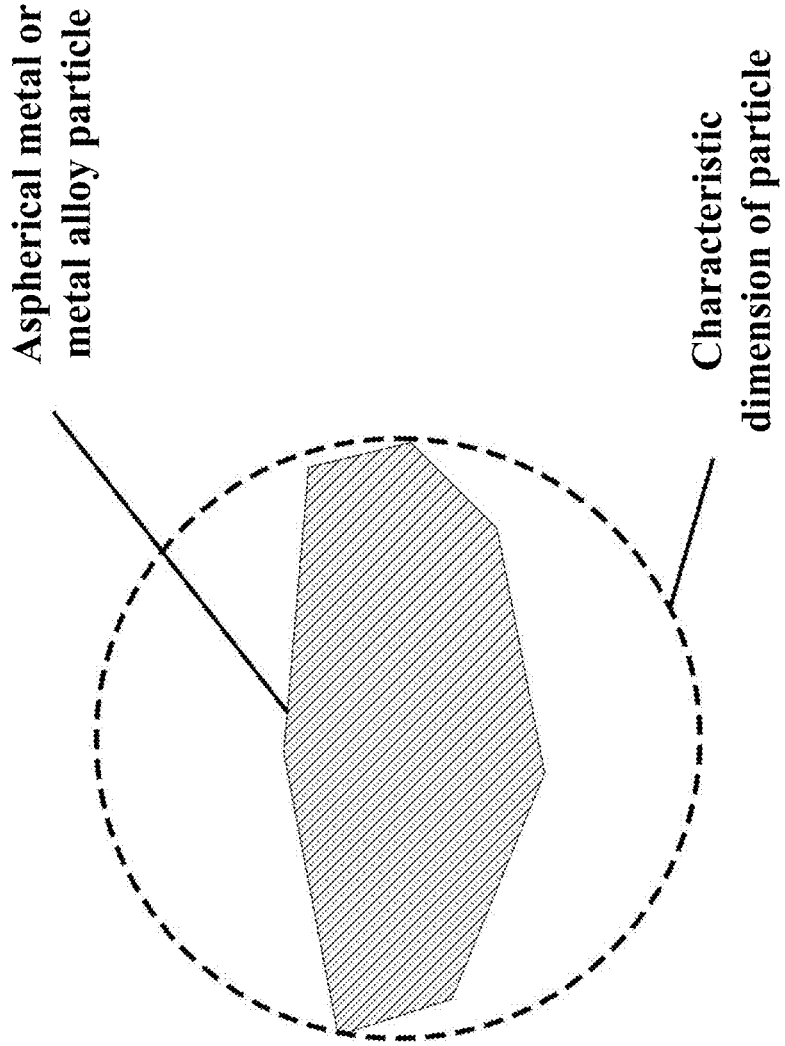
FIG. 1 depicts an aspherical metal or metal alloy particle that has a platelet geometry, in exemplary embodiments.

The compositions, structures, methods, and systems of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the invention provide an alternative to the current tradeoff of material cost versus component performance in powder-based metal additive manufacturing and other powder metallurgy processes. Rather than gas or water atomization of powders as the sole means of powder production, the methods disclosed herein employ mechanical agitation or chemical milling to produce aspherical metal or metal alloy powders from wrought, non-weldable feedstocks that are not compatible with typical metal additive-manufacturing processes. The surfaces of the aspherical powders are then covered with a plurality of other smaller particles to control solidification conditions in the aspherical powder when it undergoes a phase change.

This discovery enables the use of ultra-low-cost (<$45 per kg) feedstock materials since wrought, non-weldable materials (e.g., 2000 or 7000 series aluminum alloys) are readily available either in bulk or as waste from other industrial processes (e.g., recycling, machining scrap, end-of-life components, etc.). By incorporating surface-assembled particulates to functionalize metals or metal alloys and render them compatible with metal additive manufacturing and other powder metallurgy processes, novel feedstocks may be utilized which were heretofore non-utilizable.

Some variations of the invention provide a means of forming high-performance, low-cost powders by eschewing conventional gas or water atomization processes. In some embodiments, controlled-atmosphere heat treatments are applied to change the morphology of a feedstock, followed by a mechanical agitation or chemical milling step to generate particles (powder) from the feedstock, without undergoing a phase change that melts and resolidifies the particles in a gas stream or water stream. A plurality of functional, smaller particles is then scalably assembled on the non-atomized powder particle surface to render the powder compatible with powder metallurgy or metal additive-manufacturing processes. By combining a low-cost method of forming a powder with a method to make metal alloys compatible with metal additive-manufacturing processes, variations of this invention solve both process cost and feedstock availability problems in current metal additive manufacturing and powder metallurgy.

Conventional atomization processes used to form a spherical, monodisperse powder feedstock adds significant cost (often >20×) compared to the input ingot materials used for atomization. Problems with conventional atomization include: (a) significant time and energy required to melt and spray-atomize large volumes of powder (thousands of kilograms); (b) safety concerns with combustible dust cloud formation in powders small than 100 microns; (c) low yield (25-35%) in the size range desired (15-60 microns); (d) the inability to remelt and reuse scrap or out-of-spec powders; and (e) a lack of secondary market for ingot materials with expensive alloying elements (e.g., Ag, Sc, or Ti) to form the powder feedstocks. By contrast, the present invention does not require expensive atomization and does not require an ingot material that contains expensive alloying elements.

Also, reuse and recycling is a significant feature in some variations of the invention, in contrast to conventional atomization processes.

Methods for recycling powder feedstocks are known. See Asgari et al., "On microstructure and mechanical properties of additively manufactured AlSi10Mg_200C using recycled powder", *Materials Science & Engineering* A 707 (2017) 148-158; and Strondl et al., "Characterization and Control of Powder Properties for Additive Manufacturing", *JOM* Vol. 67, No. 3 (2015) 549-554, which are hereby incorporated by reference. In these prior-art approaches, powder feedstocks or components produced from powder feedstocks are processed in order to obtain a particle-size distribution compatible with metal additive manufacturing. However, it is important to note that no additional processing or materials were added to these materials. The materials were already weldable or compatible with metal additive manufacturing processes prior to post-processing. By contrast, in the present invention, the starting feedstock (prior to surface functionalization) need not be weldable or compatible with metal additive manufacturing.

As one example, according to the principles described herein, high-performance, wrought metal alloys (e.g., 2000 and 7000 series aluminum alloys) may be utilized in various manufacturing processes (e.g., metal additive manufacturing) without incurring the typical cost penalty (>20× over raw material price) arising from gas or water atomization processes. As such, there is a particular benefit in commercial product lines incorporating a sizable fraction (such as 15 vol % or more) of metal alloy components. Good examples of these applications include, but are not limited to, commercial aviation and performance automotive platforms for which metal additive-manufacturing costs cannot heretofore compete with subtractive machining processes.

The metal-containing functionalized material has a unique, observable physical structure for powder feedstocks used in metal additive manufacturing or other powder metallurgy processes. In contrast to typical gas-atomized powder feedstocks used in additive-manufacturing processes, the metal-containing functionalized material contains aspherical particles that may be formed from non-weldable, wrought metal alloy feedstocks. The aspherical particles are produced by mechanical agitation or chemical milling in which phase change does not occur—there is no melting and resolidification during formation of the powder feedstock. The absence of solid-liquid phase change of the metal or metal alloy is detectable in the final material, using imaging analysis, for example.

Some variations provide a metal-containing functionalized material comprising:

(a) a plurality of aspherical particles comprising a metal or a metal alloy; and (b) a plurality of particulates that are physically and/or chemically assembled on surfaces of the aspherical particles, wherein the particulates are selected from the group consisting of metals, metal alloys, metal carbides, metal nitrides, metal borides, metal hydrides, metal oxides, metal sulfides, ceramics, and combinations thereof, wherein the particulates are compositionally different than the aspherical particles, and wherein the particulates have an average particulate size that is different than an average aspherical-particle size of the aspherical particles.

In this disclosure, an "aspherical" particle means that the particle has a sphericity that is less than 1.0. Sphericity is the ratio of the surface area of a sphere with the same volume as the given particle to the surface area of the particle. In some embodiments, an aspherical particle has a sphericity that is about, or less than about, 0.99, 0.98, 0.97, 0.96, 0.95, 0.94, 0.93, 0.92, 0.91, or 0.90. A perfect sphere has a sphericity of exactly 1, which is the maximum value of sphericity. As other examples, a cube has a sphericity of 0.81, while a tetrahedron (triangular pyramid) has a sphericity of 0.67. The sphericity of a high-aspect-ratio shape (e.g., a rod) is much less than 1.

In some embodiments, the aspherical particles are selected from whiskers, needles, rods, fibers, oblate spheroids, prolate spheroids, parallelepipeds, rhomboids, rectangular prisms, platelets, faceted particles, randomly shaped particles, and/or combinations thereof. In a typical embodiment, multiple shapes of aspherical particles are present, which may lead to better packing efficiency.

The aspherical particles may be characterized by a particle size that is also referred to as a characteristic dimension of aspherical particles. In some embodiments, a characteristic dimension is an effective diameter, i.e. a particle diameter that is calculated from an imaginary sphere of the same volume as the particle volume analyzed. In some embodiments, a characteristic dimension is a particle length, which is useful for whiskers, needles, rods, and fibers, for example. In some embodiments, a characteristic dimension is a platelet maximum width (in the dimension transverse to thickness), such as shown in FIG. 1.

Particle sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images. Finally, sieving is a conventional technique of separating particles by size.

In certain embodiments utilizing laser diffraction, particle size is calculated by measuring the angle of light scattered by the particles as they pass through a laser beam. Laser diffraction measures particle-size distributions by measuring the angular variation in intensity of light scattered as a laser beam passes through a dispersed particulate sample. The particle size is reported as a volume-equivalent sphere diameter. The D10, D50, and D90 values and ranges disclosed herein are mass values (rather than number or volume values).

The aspherical particles may be characterized by a median particle size (D50) from 5 microns to 10 millimeters. D50 represents the particle size corresponding to 50% (by mass) cumulative undersize particle size distribution. For example, for a D50 value of 25 microns, 50% of the aspherical particles are smaller than 25 microns. In various embodiments, the median particle size is within the range 15-45 μm, 40-70 μm, 45-70 μm, 70-125 μm, 125-300 μm, 300-600 μm, or 600-10000 μm, for example. In some embodiments, the D50 particle size is less than 1000 μm (1 millimeter).

The aspherical particles may be characterized by a D10 particle size from 0.1 microns to 1 millimeter. D10 represents the particle size corresponding to 10% (by mass) cumulative undersize particle size distribution. For example, for a D10 value of 5 microns, 10% of the aspherical particles are smaller than 5 microns. In some embodiments, the D10 particle size is less than 0.1 microns.

The aspherical particles may be characterized by a D90 particle size from 20 microns to 100 millimeters. D90 represents the particle size corresponding to 90% (by mass) cumulative undersize particle size distribution. For example, for a D90 value of 50 microns, 90% of the aspherical particles are smaller than 50 microns. In some embodiments, the D90 particle size is less than 20 microns.

The particle-size distribution of the aspherical particles may be monodisperse or polydisperse. Also, the particle-size distribution of the aspherical particles may be unimodal or polymodal, such as bimodal. In some embodiments, the particle-size distribution is bimodal which leads to good packing efficiency of the particles.

The "packing efficiency" of particles is the density of the particles as they are actually packed, divided by the density of the particle material itself. Thus the packing efficiency of a single, non-porous slab of material is 100%. The packing efficiency of perfect spheres is about 74%. In some embodiments of the metal-containing functionalized material, the aspherical particles are characterized by a packing efficiency from 40% to 65%, such as 40-49%, 49-55%, 55-60%, or 60-65%. In certain embodiments of the invention, the packing efficiency is less than 64%. In certain cases with random shapes, the packing efficiency is less than 40%. In certain embodiments, a combination of shapes and sizes leads to a packing efficiency greater than 65%.

It is noted that the metal-containing functionalized material may further comprise spherical particles comprising a metal or a metal alloy. Spherical or nearly spherical particles may be present as impurities, or as randomly shaped particles that arbitrarily happen to be nearly spherical.

In certain embodiments, a quantity of spherical or nearly spherical particles (e.g., purchased spherical particles) comprising a metal or a metal alloy may intentionally be added to the metal-containing functionalized material, or the metal-containing functionalized material may be added to spherical particles. Of the particles that contain the base metal or metal alloy (i.e., element (a) above, not including the particulates), preferably less than 10%, and more preferably less than 5%, less than 2%, less than 1%, less than 0.5%, less than 0.2%, less than 0.1%, less than 0.05%, less than 0.02%, or less than 0.01%, are spherical (these percentages are based on number of particles containing the base metal or metal alloy). In some embodiments, there are essentially no detectable spherical particles in the base metal or metal alloy.

In some embodiments, the aspherical particles contain a metal selected from the group consisting of aluminum, titanium, cobalt, chromium, iron, copper, tungsten, magnesium, niobium, nickel, tantalum, silicon, vanadium, gold, silver, platinum, palladium, iridium, rhenium, zinc, cerium, molybdenum, zirconium, hafnium, and alloys or combinations thereof. The aspherical particles may contain at least 50 vol %, at least 60 vol %, at least 70 vol %, at least 80 vol %, at least 90 vol %, at least 95 vol %, at least 99 vol %, or 100 vol % of one or more of these metals. When the aspherical particles contain a metal alloy, the metal alloys may contain an intermetallic phase, a ceramic phase, or a phase that includes one or more p-block elements (e.g., C, N, O, etc.), for example.

For purposes of this disclosure, metalloids such as silicon are considered to be metals.

In this disclosure, "particulates" may be nanoparticles, microparticles, agglomerations, inclusions, or reaction products. The particulates may be of any shape, including spherical or aspherical. In some embodiments, the particulates are selected from spheres, whiskers, needles, rods, fibers, oblate spheroids, prolate spheroids, parallelepipeds, rhomboids, rectangular prisms, platelets, faceted particles, randomly shaped particles, and/or combinations thereof. As one example, FIG. 1 depicts an aspherical metal or metal alloy particle that has a platelet geometry. The particulates may also be referred to as "functionalizing particulates", "functionalization particulates", "surface-functionalization particulates", and the like.

The average particulate size may be from 5 nanometers to 100 microns, for example. Typically, the average particulate size is smaller than the average aspherical-particle size. In some embodiments, the average particulate size is at least an order of magnitude smaller than the average aspherical-particle size. In other embodiments, the average particulate size is the same as, or larger than, the average aspherical-particle size.

In various embodiments, the average (D50) particulate size is about, at least about, or at most about 5 nm, 10 nm, 20 nm, 30 nm, 40 nm, 50 nm, 60 nm, 70 nm, 80 nm, 90 nm, 0.1 microns, 0.2 microns, 0.3 microns, 0.4 microns, 0.5 microns, 1 micron, 2 microns, 3 microns, 4 microns, 5 microns, 6 microns, 7 microns, 8 microns, 9 microns, 10 microns, 20 microns, 30 microns, 40 microns, 50 microns, 60 microns, 70 microns, 80 microns, 90 microns, or 100 microns.

The number of particulates per particle may vary widely. The average number of individual particulates disposed on one particle (equivalently, the average number ratio of particulates to particles) may be about 10, about $10^2$, about $10^3$, about $10^4$, about $10^5$, or about $10^6$, for example. The particulate distribution on the particle surface may vary. In some embodiments, certain surface regions contain a relatively higher concentration of particulates, which may be agglomerated at the surface in those regions.

The particulate surface coverage may also vary widely, from about 1% to 100%, in various embodiments. The particulate surface coverage is the average area fraction of particles that is covered by assembled particulates. For example, the particulate surface coverage may be about, or at least about, 1%, 5%, 10%, 20%, 30%, 40%, 50%, 60%, 70%, 80%, 90%, or 100%. Due to the generally small size of particulates, benefits are possible with less than 1% surface area coverage.

In some embodiments, the particulates form a continuous coating on the aspherical particles. In other embodiments, the particulates form a discontinuous coating on the aspherical particles. When the particulates form a discontinuous coating, the surface coverage may vary widely. Generally, the particulates may be present with about 0.1% to about 100% surface coverage, on average, on aspherical particles. Some aspherical particles may have 100% surface coverage, forming a continuous coating on those particles, while other aspherical particles may have less than 100% surface coverage, forming typically a discontinuous coating. (A continuous coating with less than 100% surface coverage is possible, e.g. with elongated islands that are interconnected on the surface.) Although not desirable, there may be some aspherical particles present that have no particulates on the coating at all, while other aspherical particles are coated with particulates. Finally, some or all of the aspherical particles may be coated with multiple layers of particulates, in a continuous or discontinuous manner.

In some embodiments, the particulates contain a metal selected from the group consisting of aluminum, titanium, cobalt, zinc, tin, chromium, bismuth, neodymium, dysprosium, erbium, samarium, praseodymium, gadolinium, ytterbium, lanthanum, boron, lithium, calcium, strontium, scandium, yttrium, manganese, rhenium, iridium, lead, carbon, indium, gallium, iron, copper, tungsten, magnesium, niobium, nickel, tantalum, silicon, vanadium, gold, silver, palladium, platinum, cerium, zirconium, hafnium; carbides, nitrides, borides, hydrides, intermetallics, oxides, or sulfides thereof; and combinations of the foregoing.

In some embodiments, the particulates contain a ceramic material selected from the group consisting of SiC, HfC, TaC, ZrC, NbC, WC, TiC, $TiC_{0.7}N_{0.3}$, VC, $B_4C$, $TiB_2$, $HfB_2$, $TaB_2$, $ZrB_2$, $WB_2$, $NbB_2$, TaN, HfN, BN, ZrN, TiN, NbN, VN, $Si_3N_4$, $Al_2O_3$, $MgAl_2O_3$, $HfO_2$, $ZrO_2$, $Ta_2O_5$, $TiO_2$, $SiO_2$, oxides of rare-earth elements Y, La, Ce, Pr, Nd, Sm, Eu, Gd, Tb, Dy, Ho, Er, Tm, Yb, and/or Lu, and combinations of the foregoing.

In other embodiments, the particulates contain a carbon-containing material, such as graphite, graphene, carbon black, carbon fibers, carbon-polymer composites, activated carbon, carbon nanostructures (e.g., carbon nanotubes), diamond (e.g., nanodiamonds), and combinations thereof.

Generally speaking, the particles and/or the particulates may contain one or more elements selected from the group consisting of Al, Si, Fe, Cu, Ni, Mn, Mg, Cr, Zn, V, Ti, Bi, Ga, Pb, Zr, H, Li, Be, B, C, N, O, F, Na, P, S, Cl, K, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof. Separately from the particles and the particulates, additional elements may be present in the overall composition. For example, P-block elements and/or F-block elements may be incorporated into the particles, the particulates, both the particles and particulates, or neither the particles nor particulates but rather as a distinct additive in the metal-containing functionalized material.

As a specific example pertaining to zirconium, zirconium-containing particulates may be present as $ZrH_x$ (x=0 to 4), i.e. in hydride form when x>0. An exemplary zirconium hydride is zirconium dihydride, $ZrH_2$. As another specific example pertaining to zirconium, zirconium-containing particulates may be present as zirconium aluminide, $Al_3Zr$.

In some embodiments, the particulates include an intermetallic compound selected from the group consisting of $Al_3Zr$, $Al_3Ta$, $Al_3Nb$, $Al_3Ti$, TiB, $TiB_2$, WC, AlB, and combinations thereof.

The volumetric loading of particulates on the aspherical particles may vary widely, such as about 0.01 vol % to about 20 vol % based on the total volume of aspherical particles plus particulates that are physically and/or chemically assembled on surfaces of the aspherical particles. In some preferred embodiments, the volumetric loading of particulates on the aspherical particles is about 0.5 vol % to about 3 vol %. In various embodiments, the volumetric loading of particulates on the aspherical particles is about, at least about, or at most about 0.01, 0.05, 0.1, 0.2, 0.5, 1, 1.5, 2, 2.5, 3, 4, 5, 6, 7, 8, 9, 10, 15, or 20 vol %.

In some embodiments, the combined concentration of the aspherical particles and the particulates is from 50 vol % to 100 vol % of the metal-containing functionalized material. The combined concentration of the aspherical particles and the particulates may be in various ranges, such as 50-60 vol %, 60-74 vol %, 75-85 vol %, 85-95% vol, greater than 95 vol %, greater than 99% vol, less than 50 vol %, or less than 100 vol %. In certain embodiments, the combined concentration of the aspherical particles and the particulates is 100 vol %.

In some embodiments, the metal-containing functionalized material further comprises a spherical metal or metal alloy powder. The spherical metal or metal alloy powder may be derived from gas or water atomization. The metal or metal alloy in the spherical powder may be the same as, or different than, the metal or metal alloy in the aspherical particles. Also, the metal or metal alloy in the spherical powder may or may not be surface-functionalized with a plurality of particulates that are physically and/or chemically assembled on surfaces of the spherical particles. When the spherical particles (if present) have particulates physically and/or chemically assembled on surfaces, those particulates may be independently (from the particulates on the aspherical particles) selected from the group consisting of metals, metal alloys, metal carbides, metal nitrides, metal borides, metal hydrides, metal oxides, metal sulfides, ceramics, and combinations thereof. When the metal-containing functionalized material contains a spherical metal or metal alloy powder, its concentration (in the total metal-containing functionalized material) may be less than 20 wt %, less than 10 wt %, less than 5 wt %, less than 2 wt %, less than 1 wt %, less than 0.5 wt %, less than 0.2 wt %, or less than 0.1 wt %.

Methods of making and using the metal-containing functionalized materials will now be described. In various embodiments, method objectives may include the formation of a powder from a larger bulk solid; the assembly of a plurality of particulates on the surfaces of particles, to form a functionalized powder; and/or the melting and solidification of the functionalized powder in response to the application of an energy source (e.g., a laser beam or electron beam).

As explained above, a powder of aspherical particles comprising a metal or a metal alloy is produced from a bulk starting material. The characteristic dimension of the bulk starting material is larger than the characteristic dimension of the powder. For example, the characteristic dimension of the bulk starting material may be on the order of 1 millimeter, 1 centimeter, 10 centimeters, or 1 meter. The characteristic dimension of the powder is smaller than the characteristic dimension of the bulk starting material. For example, the characteristic dimension of the powder may be on the order of 1 millimeter, 100 microns, 10 microns, or 1 micron.

Many sources of bulk starting material are possible in this invention. Exemplary sources include, but are not limited to, raw, unfinished metal forms, such as extrudates, ingots, plates, sheets, etc.; semi-finished metal forms, such as forgings, castings, or machined parts; finished or semi-finished components, such as parts or prototypes; recycled or reclaimed materials, such as machining scraps, used components, low-quality parts, damaged parts, end-of-life components, metal scrap, machining chips, recycled components, or recycled metals; or a combination thereof. In certain embodiments, the bulk starting material is a sieved powder from a gas-atomization process that makes small particles, with the particles that are too large forming the bulk starting material.

Importantly, the bulk starting material does not need to be a material that is compatible with additive manufacturing or other powder metallurgy processes, even when it is ultimately desired to use the metal-containing functionalized materials in additive manufacturing or other powder metallurgy processes. The reason is that surface-assembled particulates are utilized to control the processing and properties of powders formed from the bulk starting materials. In preferred embodiments, the metal-containing functionalized materials are suitable for additive manufacturing and/or other powder metallurgy processes.

Methods for size-reducing the bulk starting material into aspherical metal or metal alloy particles may include mechanical agitation, chemical milling, or both mechanical agitation and chemical milling.

When mechanical agitation is employed, exemplary methods include (but are not limited to) milling, ball milling, fracturing, grinding, pulverizing, attrition milling, machining, jet milling, high-shear mixing, vibratory mixing, or acoustic mixing. In some embodiments, strain energy is applied to the bulk starting material either, such as via shear forces. An exemplary apparatus for mechanical agitation is a planetary ball mill.

Mechanical milling may be performed at or near ambient temperature (e.g., about 25° C.) or at an elevated temperature, such as about 0° C., 25° C., 50° C., 100° C., 150° C., 200° C., 250° C., 300° C., 350° C., 400° C., 450° C., 500° C., 550° C., or 600° C., for example. In some embodiments, mechanical milling is performed at a low temperature to facilitate a ductile-to-brittle transition, such as a temperature of about −270° C. to about 0° C., such as about −250° C., −200° C., −150° C., −100° C., −75° C., −50° C., or −25° C. (e.g., in cryomilling). The mechanical-milling temperature is preferably selected or adjusted (e.g., via cooling) so that essentially no solid-liquid phase change of the bulk starting material or the aspherical metal or metal alloy particles occurs. Mechanical milling may be performed for a milling time of about, at least about, or at most about 10 minutes, 30 minutes, 1 hour, 2 hours, 4 hours, 8 hours, 12 hours, 24 hours, or 48 hours, for example.

When chemical milling is employed, exemplary methods include (but are not limited to) etching, acid treatment, base treatment, dealloying, or photochemical milling. Chemical milling may be utilized to reduce the size of the bulk starting material either without mechanical agitation or in conjunction with mechanical agitation.

Chemical milling may be performed at or near ambient temperature (e.g., about 25° C.) or at an elevated temperature, such as about 0° C., 25° C., 50° C., 100° C., 150° C., 200° C., 250° C., 300° C., 350° C., 400° C., 450° C., 500° C., 550° C., or 600° C., for example. The chemical-milling temperature is preferably selected or adjusted (e.g., via cooling) so that essentially no solid-liquid phase change (of the bulk starting material or the aspherical metal or metal alloy particles) occurs. Chemical milling may utilize a biased electrical charge to facilitate controlled milling. Chemical milling may be performed for a milling time of about, at least about, or at most about 10 minutes, 30 minutes, 1 hour, 2 hours, 4 hours, 8 hours, 12 hours, 24 hours, or 48 hours, for example.

In preferred method embodiments, the mechanically milling and/or chemically milling causes essentially no solid-liquid phase change of the metal or metal alloy. By "essentially no solid-liquid phase change" it is meant that the milling procedure does not require a solid-liquid phase change in order to reduce the particle size, and that the average temperature of the milling procedure is below the melting temperatures of all metals present in concentrations greater than 1 wt % or, in the case of eutectic metal alloys, below the eutectic temperature of the metal alloy.

In some embodiments relating to metal alloys, mechanical milling is conducted below a liquidus temperature of the metal alloy, and preferably below a solidus temperature of the metal alloy. In some embodiments relating to metal alloys, chemical milling is conducted below a liquidus temperature of the metal alloy, and optionally below a solidus temperature of the metal alloy.

When high-energy mechanical agitation is employed for milling, local hot spots may form, such as at the interface between the metal feedstock and the mixing balls. The temperature at the local hot spot may exceed the melting temperature of one or more metals present in the feedstock, in the case of eutectic metal alloys, may exceed its eutectic temperature. In such a case, a small quantity of spherical particles may result, such as less than 10 wt %, less than 5 wt %, less than 2 wt %, less than 1 wt %, less than 0.5 wt %, less than 0.2 wt %, less than 0.1 wt %, less than 0.05 wt %, less than 0.02 wt %, or less than 0.01 wt % of the total mass of particles. Because the solid-liquid phase change arising from these hot spots is only incidental, such melting is considered as essentially no solid-liquid phase change during milling.

By contrast, in gas atomization for metal powder production, an elemental feedstock is melted under an air or inert gas blanket, or under vacuum. A chamber is backfilled with gas to force molten metal through a nozzle where high-velocity gas impinges onto the flowing melt and breaks it up into droplets that are spherical due to surface-tension minimization. The droplets then resolidify, forming spherical particles. The metal has undergone a solid-liquid phase change in this technique of forming particles. Other techniques of thermal assembly into spherical particles include water atomization, plasma atomization, centrifugal atomization, electrode induction melting gas atomization, plasma rotating electrode process, and plasma spheroidization—all of which require a solid-liquid phase change, in contrast to mechanical agitation and/or chemical milling, which do not require a solid-liquid phase change.

In some embodiments, the bulk starting material may be subjected to a pretreatment and/or a concurrent treatment (with milling) to reduce its ductility. Metal ductility is a measure of the metal's ability to undergo significant plastic deformation before breaking. When mechanically milling the bulk starting material, breaking is desired. Thus, reduction of ductility is beneficial to render the bulk starting material more amenable to producing particles of the desired size range with lower energy requirements. The ductility-lowering pretreatments or concurrent treatments, when employed, may be performed in the gas phase and/or in the liquid phase.

Examples of ductility-lowering pretreatments or concurrent treatments may include, but are not limited to, exposure of the bulk starting material to elevated temperature in vacuum or in the presence of air, an inert gas, or a forming gas (e.g., $H_2$, CO, etc.) to embrittle the metal or metal alloy. Embrittlement may be caused by intergranular embrittlement, hydrogen embrittlement, formation of brittle intermetallic phases or particulates, etching, chemical milling, chemical attack in intergranular regions, selective dealloying, or a combination thereof, for example.

A ductility-lowering pretreatment or concurrent treatment may be performed at ambient temperature (e.g., about 25° C.) or at an elevated temperature, such as about 50° C., 100° C., 150° C., 200° C., 250° C., 300° C., 350° C., 400° C., 450° C., 500° C., 550° C., or 600° C., for example. The ductility-lowering pretreatment or concurrent treatment may be performed for a treatment time of about, at least about, or at most about 10 minutes, 30 minutes, 1 hour, 2 hours, 4 hours, 8 hours, 12 hours, or 24 hours, for example. Elevated temperatures may reduce the time required to embrittle the metal or metal alloy feedstock, when that is desired. The ductility-lowering pretreatment or concurrent treatment may be performed in the presence of hydrogen, or a gas containing hydrogen (e.g., syngas), to cause hydrogen embrittlement.

In some embodiments employing mechanical agitation and a concurrent ductility-lowering treatment, milling at cryogenic temperatures (cryomilling) may be performed to reduce the size of particles. In some embodiments employing chemical milling and a concurrent ductility-lowering treatment, chemical milling at cryogenic temperatures may be performed to reduce the size of particles.

Optionally, passive media such as abrasive media or grinding media may be introduced into a mechanical-agitation process to control the particle size distribution, improve the yield, and reduce the time required for mechanical agitation. Exemplary media include, but are not limited to, steel (e.g., carbon steel, chrome steel, or stainless steel) and ceramics (e.g., agate, alumina, yttria-stabilized zirconia, zirconium silicate, zirconia-toughened alumina, or tungsten carbide). Optionally, chemical additives (e.g., stearic acid) may also be applied in order to lubricate the surfaces of the powder particles, prevent particle agglomeration, or reduce contamination from passive media.

Figure 2:
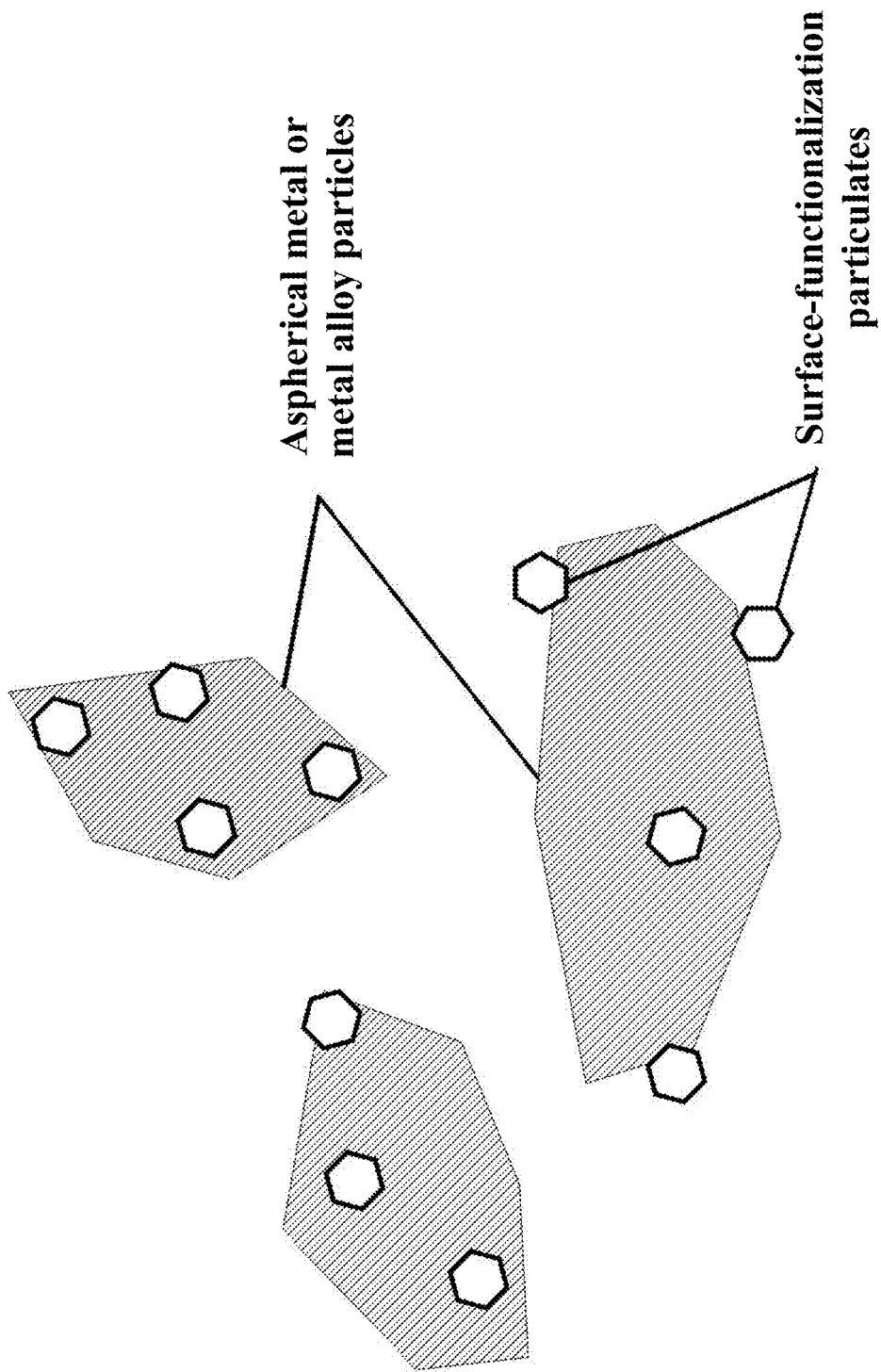
FIG. 2 depicts the assembly of surface-functionalization particulates on aspherical particles, in exemplary embodiments.

After formation of a plurality of aspherical particles in the aforementioned size ranges, a plurality of particulates of composition and size dissimilar from the aspherical particles is assembled on the surfaces of the particles. FIG. 2 depicts the assembly of surface-functionalization particulates on aspherical particles. The surface-functionalization particulates functionalize the surfaces of the aspherical particles, proving a metal-containing functionalized material. The functionalization may adjust or control the composition, microstructure, and/or processing of the metal-containing functionalized material that may be utilized in additive manufacturing or other powder metallurgy processes.

For example, the particulates may allow control of solidification after a phase change of the aspherical particles. The particulates may allow control of grain size and/or grain quality in a solidified metal-containing functionalized material. The particulates may allow strengthening of a metal alloy. The particulates may allow formation of a metal matrix composite. The particulates may allow micro-alloying of the aspherical particles or formation of compositions otherwise unattainable via gas atomization. For instance, otherwise-unattainable compositions may include insoluble additions; compositions that would vaporize during long duration holds in the liquid phase during melt atomization; or compositions that would form or coarsen brittle intermetallic phases.

Various types of materials may be employed for the functionalizing particulates. Examples include pure metals, metal alloys, metal carbides, metal oxides, metal nitrides, metal hydrides, metal borides, and combinations thereof. Alternatively, or additionally, oxide or non-oxide ceramic particulates may be employed. Preferably, a single composition of functionalizing particulate is employed, although a plurality of different functionalizing particulate compositions may be employed. In some embodiments, the functionalizing particulates are added to all aspherical particles. In other embodiments, the functionalizing particulates are assembled onto a subset of aspherical particles.

Surface-functionalization particulates may be obtained from any source, such as a commercial manufacturer. In some embodiments, surface-functionalization particulates may be produced by mechanical milling, chemical milling, gas atomization, or liquid atomization of a starting feedstock. The starting feedstock may be a purchased feedstock to be milled, in the form of pellets, ingots, plates, sheets, etc. The starting feedstock for making the particulates may include semi-finished metal forms, such as forgings, castings, or machined parts; finished or semi-finished components, such as parts or prototypes; recycled or reclaimed materials, such as machining scraps, used components, low-quality parts, damaged parts, end-of-life components, metal scrap, machining chips, recycled components, or recycled metals; or a combination thereof.

Some variations of the invention provide a method of fabricating a metal-containing functionalized material, the method comprising:

(a) providing a bulk feedstock containing a metal or a metal alloy;

(b) mechanically milling and/or chemically milling the bulk feedstock to generate a plurality of aspherical particles comprising the metal or metal alloy, wherein the aspherical particles are smaller than the length scale of the bulk feedstock;

(c) providing particulates selected from the group consisting of metals, metal alloys, metal carbides, metal nitrides, metal borides, metal hydrides, metal oxides, metal sulfides, ceramics, and combinations thereof, wherein the particulates are compositionally different than the aspherical particles; and (d) physically and/or chemically assembling the particulates onto surfaces of the aspherical particles, wherein the particulates have an average particulate size that is different than an average aspherical-particle size of the aspherical particles.

In some method embodiments, the aspherical particles include whiskers, needles, rods, fibers, oblate spheroids, prolate spheroids, parallelepipeds, rhomboids, rectangular prisms, platelets, faceted particles, and randomly shaped particles. The aspherical particles may be characterized by a median particle size (D50) from 10 microns to 1 millimeter, for example. The average particulate size may be from 5 nanometers to 100 microns, for example. Typically, the average particulate size is smaller than the average aspherical-particle size, although that is not necessarily the case.

In some methods, the aspherical particles contain a metal selected from the group consisting of aluminum, titanium, cobalt, chromium, iron, copper, tungsten, magnesium, niobium, nickel, tantalum, silicon, vanadium, gold, silver, cerium, molybdenum, zirconium, hafnium, and combinations thereof.

In some methods, the particulates contain a metal selected from the group consisting of aluminum, titanium, cobalt, zinc, tin, chromium, iron, copper, tungsten, magnesium, niobium, nickel, tantalum, silicon, vanadium, gold, silver, palladium, platinum, cerium, zirconium, hafnium; carbides, nitrides, borides, hydrides, oxides, or sulfides thereof; and combinations of the foregoing.

The particulates may be attached to the aspherical particles using electrostatic forces, Van der Waals forces, chemical bonds, physical bonds, and/or any other force. A chemical bond is the force that holds atoms together in a molecule or compound. Electrostatic and Van der Waals forces are examples of physical forces that can cause bonding. A physical bond is a bond that arises when molecular entities become entangled in space. Typically, chemical bonds are stronger than physical bonds. Chemical bonds may include ionic bonds, covalent bonds, or a combination thereof.

Many methods are possible for attaching particulates to aspherical particles. Some methods include immersion deposition, electroless deposition, vapor coating, solution/suspension coating of particles with or without organic ligands, and utilizing electrostatic forces and/or Van der Waals forces to attach particles through mixing.

In some variations, a solvent approach is employed in which a solvent (such as water or tetrahydrofuran) and particulates are added to a powder of aspherical particles, mixed, and then dried. The choice of solvent(s) will depend on solvent compatibility of the particulates and aspherical particles. The solvent should dissolve or suspend at least one of the components (particulates or aspherical particles). In certain embodiments, a slurry of dispersed particulates in solvent is sprayed on powder feedstock while mixing in order to coat all the aspherical particles with particulates. Following removal of solvent, Van der Waals forces, chemical bonds, physical adsorption, or other forces may cause the particulates to be retained on surfaces of the aspherical particles.

The particulates may be dissolved in a solvent that has lower surface energy than the particulates. When this solvent is evaporated from a mixture of particulates and aspherical particles, the particulates are drawn by capillary forces to aspherical particle surfaces, in some embodiments.

The solvent for dissolving or suspending particulates and/or aspherical particles may be selected from polar organic solvents (e.g., acetone), non-polar organic solvents (e.g., n-hexane), polar inorganic solvents (e.g., water), non-polar inorganic solvents, ionic liquids, compressed and liquefied gases (e.g., liquefied carbon dioxide), supercritical fluids (e.g., supercritical carbon dioxide), or a combination thereof.

In some embodiments, the solvent comprises or consists essentially of a compressed and liquefied gas and/or a supercritical fluid. In certain embodiments, the solvent is liquefied or supercritical $CO_2$. Employing a liquefied or supercritical $CO_2$ solution of particulates and aspherical particles allows mixing of the aspherical particles in a fluidized bed, with the benefit of not requiring a flammable solvent (i.e., mixing is conducted in an atmosphere incapable of igniting). After surface functionalization, the $CO_2$ may be vented off quickly and recycled, thereby eliminating waste while also drying the powder. Following removal of liquefied or supercritical $CO_2$, Van der Waals forces, chemical bonds, physical adsorption, or other forces may cause the particulates to be retained on surfaces of the aspherical particles.

In some variations, particulates are assembled onto aspherical particles via dry mixing, in which particulates are added to dry powder feedstock and mixed. The dry mixing may be accomplished by stirring, rolling, vibration, ball milling, centrifugation, fluidized-bed blending, sonication, or another mechanical technique. Dry mixing may be carried out with a gas-containing mixing media, such as (but not limited to) air, nitrogen, carbon dioxide, argon, or a combination thereof. Following dry mixing, Van der Waals forces, chemical bonds, physical adsorption, or other forces may cause the particulates to be retained on surfaces of the aspherical particles.

Some embodiments employ sonication. Sonication is the application of sound energy (such as at a frequency of 20 kHz or more) to agitate the particulates and aspherical particles, to promote mixing and assembly.

When dry mixing using a gas-phase mixing media, it is preferable to maintain an atmosphere to retain the mixing media, the aspherical particles, and the particulates in the desired state(s). Also, a closed environment is preferred to avoid the escape of particles from the system.

In some variations, particulates are assembled onto aspherical particles via electrostatic interactions. Electrostatic assembly may be carried out by introducing opposite electrical charges, or at least polarities, to the particulates versus the powder particle surfaces, prior to or during surface functionalization. Electrostatic interactions can be preferred since they are generally isotropic and reasonably strong. Electrostatic assembly may be done with wet mixing (i.e. with a solvent present), dry mixing, or a sequential combination thereof. For example, the powder particles may be blown as dry material while mixing with particulates, inducing a static charge that enables particulates to be retained on surfaces of the powder particles. In these variations, electrostatic forces cause the particulates to be retained on surfaces of the powder particles. Charged particulates (induced from blowing as a dry material) may be deposited onto oppositely charged aspherical particle surfaces, along with chemical bond formation. Electrical charges may also be induced by exposure to an electrical or electromagnetic field, or by chemical reaction, for example.

Other techniques for assembling particulates onto aspherical particles include, but are not limited to, centrifuge sedimentation, electromagnetic sedimentation, electrochemical deposition, and pulse-laser deposition. Various force fields may be utilized, such as electric fields, magnetic fields, or physical force fields. Physical forces may include high-velocity impingement, viscous flow, or large amplitude oscillatory shear, for example.

A particulate-based coating may or may not be in the form of distinct, observable particulates. That is, the coating may be derived from particulates, but discrete particulates are not necessarily present.

Assembly aids may be incorporated into any of these assembly methods. Assembly aids enhance the retention of particulates on surfaces of the powder particles. In particular, assembly aids may enhance the chemical kinetics of particulate assembly, the thermodynamics of particulate assembly, or the diffusion or mass transport of particulate assembly, for example. Assembly aids may be selected from the group consisting of surfactants, salts, dissolved ions, charged molecules, polar or non-polar solvents, hierarchically sized particulates, surface etchants for surface texture, and combinations thereof. For example, surfactants may reduce surface tension between particulates and powder surfaces, resulting in better wetting and assembly. Salts or ions may alter the surface charge of the particulates or powder surfaces, resulting in ionic bonds that enhance the assembly. Surface etchants may physically etch the surface of the powder to promote adsorption of particulates.

When high surface coverage is desired of particulates on aspherical particles, drop-casting, spin-coating, or spray-coating, or Langmuir-Blodgett coating may be utilized.

In drop-casting, a particulate dispersion is spread over a substrate and allowed to dry under controlled conditions, e.g. pressure and temperature. In principle, film thickness depends on the volume of dispersion used and the particulate concentration, both of which can be easily varied. There are also other variables that affect the film structure such as how well the solvent wets the substrate, evaporation rate, capillary forces associated with drying, etc. Generally, it is desirable to use solvents that are volatile, wet the substrate, and are not susceptible to thin film instabilities (de-wetting). Water tends to be a poor solvent for drop-casting due to the low vapor pressure and large surface tension. Organic solvents (such as hexane, toluene, alcohols, or halogenated solvents) are often good choices for particulates with hydrophobic capping ligands.

Spin-coating often provides more uniform film thicknesses across the substrate compared with drop-casting, and can accommodate larger substrates. In this technique, a substrate is spun at high speed and a volume of material with known particle concentration is introduced into the center. Centrifugal force leads to uniform spreading of the dispersion across the substrate, followed by evaporation of solvent to yield a thin particle film. Film thickness depends on the dispersion concentration, volume, and the rotational velocity. As with drop-casting, solvents other than water are favored. Slowly withdrawing a substrate from a particulate dispersion causes particles to be drawn into the meniscus and deposited as the thin liquid layer dries.

Spray-coating utilizes a homogenous, aerosolized stream applied onto a target substrate. For example, a syringe pump may be used to supply a constant liquid flow to a nebulizer where the stream is combined with an inert gas. The resulting mixture forms aerosolized droplets (containing particulates) that deposit onto the substrate (aspherical particles) in a homogenous manner. The nebulizer may be attached to a movable platform that covers a wide range of area. Volatile solvents are preferred to maximize liquid evaporation and reduce any potential nanoparticle aggregation associated with capillary forces during drying.

Langmuir-Blodgett troughs offer a high level of control over the particulate deposition process since the formation of the particulate film can be performed separately from the transfer of the film to the substrate (aspherical particles). In using this technique, a dispersion of particulates is evaporated onto an immiscible liquid substrate in the Langmuir-Blodgett trough. The particulate layer can then be compressed using a movable barrier to obtain uniform monolayer or sub-monolayer films over relatively large areas. A substrate can be dipped into the particle layer, or a pre-submerged substrate can be withdrawn, and the particulates film deposits at the liquid-solid interface. This technique is beneficial for uniform film formation across the aspherical particles.

In some preferred embodiments, the metal-containing functionalized material is utilized in powder-based metal additive-manufacturing processes that include application of a laser or electron beam energy source for melting and solidification. Alternatively, or additionally, the metal-containing functionalized material may be used in other powder metallurgy processes such as, but not limited to, sintering, field-assisted sintering, powder compaction, pressing, shock consolidation, or extrusion. The metal-containing functionalized material may be used on its own, i.e. comprising 100% of the powder mass employed in additive manufacturing or a powder metallurgy process. The metal-containing functionalized material may be used in conjunction with particles formed via another method (e.g., gas atomization).

In some preferred embodiments, the metal-containing functionalized material is a low-cost, high-strength metal alloy additive-manufacturing powder feedstock formed from recycling or reclamation of bulk wrought alloys.

Some variations provide a process for additive manufacturing of a functionalized metal alloy, the process comprising:
 (a) providing a metal-containing functionalized material;
 (b) exposing a first amount of the metal-containing functionalized material to an energy source for melting the first amount of the metal-containing functionalized material, thereby generating a first melt layer;
 (c) solidifying the first melt layer, thereby generating a first solid layer;
 (d) repeating steps (b) and (c) a plurality of times to generate a plurality of solid layers by sequentially solidifying a plurality of melt layers in an additive-manufacturing build direction, thereby producing an additively manufactured functionalized metal alloy; and
 (e) recovering the additively manufactured functionalized metal alloy,
wherein the additively manufactured functionalized metal alloy preferably has a microstructure with equiaxed grains.

The energy source in step (b) may be provided by a laser beam, an electron beam, alternating current, direct current, plasma energy, induction heating from an applied magnetic field, ultrasonic energy, other sources, or a combination thereof. Typically, the energy source is a laser beam or an electron beam.

Process steps (b) and (c) may utilize a technique selected from the group consisting of selective laser melting, electron beam melting, laser engineered net shaping, selective laser sintering, direct metal laser sintering, integrated laser melting with machining, laser powder injection, laser consolidation, direct metal deposition, wire-directed energy deposition, plasma arc-based fabrication, ultrasonic consolidation, and combinations thereof, for example.

In certain embodiments, the additive-manufacturing process is selected from the group consisting of selective laser melting, energy-beam melting, laser engineered net shaping, and combinations thereof.

Selective laser melting utilizes a laser (e.g., Yb-fiber laser) to provide energy for melting. Selective laser melting designed to use a high power-density laser to melt and fuse metallic powders together. The process has the ability to fully melt the metal material into a solid 3D part. A combination of direct drive motors and mirrors, rather than fixed optical lens, may be employed. An inert atmosphere is usually employed. A vacuum chamber can be fully purged between build cycles, allowing for lower oxygen concentrations and reduced gas leakage.

Electron beam melting uses a heated powder bed of metal that is then melted and formed layer by layer, in a vacuum, using an electron beam energy source similar to that of an electron microscope. Metal powder is welded together, layer by layer, under vacuum.

Laser engineered net shaping is a powder-injected technique operates by injecting metal powder into a molten pool of metal using a laser as the energy source. Laser engineered net shaping is useful for fabricating metal parts directly from a computer-aided design solid model by using a metal powder injected into a molten pool created by a focused, high-powered laser beam. Laser engineered net shaping is similar to selective laser sintering, but the metal powder is applied only where material is being added to the part at that moment. Note that "net shaping" is meant to encompass "near net" fabrication.

Direct metal laser sintering process works by melting fine powders of metal in a powder bed, layer by layer. A laser supplies the necessary energy and the system operates in a protective atmosphere, typically of nitrogen or argon.

Another approach utilizes powder injection to provide the material to be deposited. Instead of a bed of powder that is reacted with an energy beam, powder is injected through a nozzle that is then melted to deposit material. The powder may be injected through an inert carrier gas or by gravity feed. A separate shielding gas may be used to protect the molten metal pool from oxidation.

Directed energy deposition utilizes focused energy (either an electron beam or laser beam) to fuse materials by melting as the material is being deposited. Powder or wire feedstock can be utilized with this process. Powder-fed systems, such as laser metal deposition and laser engineered net shaping, blow powder through a nozzle, with the powder melted by a laser beam on the surface of the part. Laser-based wirefeed systems, such as laser metal deposition-wire, feed wire through a nozzle with the wire melted by a laser, with inert gas shielding in either an open environment (gas surrounding the laser), or in a sealed gas enclosure or chamber.

Some embodiments utilize wire feedstock and an electron beam heat source to produce a near-net shape part inside a vacuum chamber. An electron beam gun deposits metal via the wire feedstock, layer by layer, until the part reaches the desired shape. Then the part optionally undergoes finish heat treatment and machining. Wire can be preferred over powder for safety and cost reasons. In the present invention, a wire feedstock may be produced from aspherical particles coated with particulates, by melting and solidification, for later use as an additive manufacturing feedstock, for example.

Herderick, "Additive Manufacturing of Metals: A Review," *Proceedings of Materials Science and Technology* 2011, Additive Manufacturing of Metals, Columbus, Ohio, 2011, is hereby incorporated by reference herein for its teaching of various additive manufacturing techniques.

In any of these additive-manufacturing techniques, post-production processes such as heat treatment, light machining, surface finishing, coloring, stamping, or other finishing operations may be applied. Also, several additively manufactured parts may be joined together chemically or physically to produce a final object.

The additively manufactured functionalized metal alloy, following recovery in step (e), preferably has a microstructure that is substantially crack-free. In some embodiments, the additively manufactured functionalized metal alloy has a microstructure that is substantially free of porous void defects.

In some embodiments, the additively manufactured functionalized metal alloy is characterized by an average grain size of less than 1 millimeter, such as about, or less than about, 500, 400, 300, 200, 150, 100, 75, 50, 40, 30, 20, 15, 10, 5, 4, 3, 2, 1, 0.5, 0.4, 0.3, 0.2, or 0.1 microns.

In some embodiments, the additively manufactured functionalized metal alloy has a microstructure with a crystallographic texture that is not solely oriented in the additive-manufacturing build direction. For example, the solid layers may have differing primary growth-direction angles with respect to each other.

An additive-manufacturing process is not limited in principle to the number of solid layers that may be fabricated. A "plurality of solid layers" means at least 2 layers, such as at least 10 individual solid layers in the additively manufactured functionalized metal alloy. The number of solid layers may be much greater than 10, such as about 100, 1000, 10000, or more. The plurality of solid layers may be characterized by an average layer thickness of at least 10 microns, such as about 10, 20, 30, 40, 50, 75, 100, 150, or 200 microns.

In some embodiments, aluminum is present in the additively manufactured functionalized metal alloy at a concentration from about 0.1 wt % to about 90 wt %. In some embodiments, copper is present at a concentration from about 0.1 wt % to about 90 wt %. In these or other embodiments, magnesium is present at a concentration from about 0.1 wt % to about 90 wt %. In these or other embodiments, at least one of zinc or silicon is present at a concentration from about 0.1 wt % to about 90 wt %. In some embodiments, the metal alloy further comprises chromium. In some embodiments, scandium is not present in the additively manufactured functionalized metal alloy.

A metal alloy microstructure that has "equiaxed grains" means that at least 90 vol %, preferably at least 95 vol %, and more preferably at least 99 vol % of the metal alloy contains grains that are roughly equal in length, width, and height. In preferred embodiments, at least 99 vol % of the metal alloy contains grains that are characterized in that there is less than 25%, preferably less than 10%, and more preferably less than 5% standard deviation in each of average grain length, average grain width, and average grain height. In the metal alloy, crystals of metal alloy form grains in the solid. Each grain is a distinct crystal with its own orientation. The areas between grains are known as grain boundaries. Within each grain, the individual atoms form a crystalline lattice. In this disclosure, equiaxed grains result when there are many nucleation sites arising from grain-refining particulates contained in the metal alloy microstructure.

In some embodiments, the microstructure is further characterized by a dispersed microstructure. A dispersed microstructure generally arises from the large number of dendrites and grain boundaries within the microstructure, which in turn arise from the large number of particulates on surfaces of particles. The degree of dispersion may be characterized by a dispersion length scale, calculated as the average spacing between particulates and/or the average length scale in the metal phase between particulates. In some embodiments, the dispersion length scale is from about 1 nanometer to about 100 microns, such as from about 10 nanometers to about 10 microns, or about 100 nanometers to about 1 micron. In various embodiments, the dispersion length scale is about, at least about, or at most about 0.1, 0.2, 0.3, 0.4, 0.5, 0.6, 0.7, 0.8, 0.9, 1, 1.5, 2, 3, 4, 5, 6, 7, 8, 9, 10, 11, 12, 13, 14, 15, 20, 25, 30, 35, 40, 45, or 50 microns.

The additively manufactured functionalized metal alloy may comprise inclusions that contain both (i) at least one metal from the aspherical particles and (ii) at least one element from the particulates. An example of an inclusion is $Al_3Zr$ in which the aluminum atoms are derived from the aspherical particles and the zirconium atom is derived from zirconium-containing particulates (e.g., Zr or $ZrH_2$ nanoparticles). During additive manufacturing, a chemical reaction may take place to form $Al_3Zr$ inclusions which themselves may act as grain-refining inoculants.

In some embodiments, the particulates are lattice-matched to within ±5% compared to an otherwise-equivalent metal alloy not containing the particulates. In certain embodiments, the particulates are lattice-matched to within ±2% or within ±0.5% compared to an otherwise-equivalent metal alloy not containing the particulates.

In some embodiments, the particulates are atomic density-matched to within ±25% compared to an otherwise-equivalent metal alloy not containing the particulates. In certain embodiments, the particulates are atomic density-matched to within ±5% or within ±0.5% compared to an otherwise-equivalent metal alloy not containing the particulates.

Preferably, the microstructure of the additively manufactured functionalized metal alloy is substantially crack-free. A metal alloy microstructure that is "substantially crack-free" means that at least 99.9 vol % of the metal alloy contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a crack contains open space, which may be vacuum or may contain a gas such as air, $CO_2$, $N_2$, and/or Ar. A crack may also contain solid material different from the primary material phase of the metal alloy. The non-desirable material disposed within the crack may itself contain a higher porosity than the bulk material, may contain a different crystalline (or amorphous) phase of solid, or may be a different material altogether, arising from impurities during fabrication, for example.

A three-dimensional architecture may develop in the final additively manufactured microstructure. A "three-dimensional architecture" means that the particulates are not randomly distributed throughout the additively manufactured part. Rather, in a three-dimensional architecture of particulates, there is some regularity in spacing between particulates, in space (three dimensions). The average spacing between particulates may vary, such as from about 1 particulate diameter to about 100 particulates diameter or more, depending on the particulate concentration in the material.

In some embodiments, the three-dimensional architecture of particulates in the additively manufactured part is correlated to the distribution of particulates within the starting composition. Such a three-dimensional architecture of particulates is possible when the kinetics during melting and solidification are controlled such that the integrity and dispersion of particulates are preserved.

In some embodiments, the particulates do not melt and do not significantly disperse from the original dispositions, relative to each other, following melting of the metal(s) and then during solidification. In certain embodiments, the particulates melt, soften (such as to become a glass), or form a liquid-solution solution, yet do not significantly disperse from the original dispositions, relative to each other, following melting of the metal(s) and/or during solidification. When such particulates resolidify (or undergo a phase transition) during solidification of the melt, they assume their original dispositions or approximate coordinates thereof. In some embodiments, whether or not the particulates melt, the particulates end up in a three-dimensional architecture in which the locations of particulates are different than the original dispositions, but may be correlated and therefore predictable based on the starting functionalized feedstock.

The metal alloy microstructure may be substantially free of porous defects, in addition to being substantially crack-free. "Substantially free of porous defects" means at least 99 vol % of the metal alloy contains no porous voids having an effective diameter of at least 1 micron.

Preferably, at least 80 vol %, more preferably at least 90 vol %, even more preferably at least 95 vol %, and most preferably at least 99 vol % of the metal alloy contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the metal alloy contains no larger porous voids having an effective diameter of at least 5 microns.

Typically, a porous void contains open space, which may be vacuum or may contain a gas such as air, $CO_2$, $N_2$, and/or Ar. Porous voids may be reduced or eliminated, in some embodiments. For example, additively manufactured metal parts may be hot-isostatic-pressed to reduce residual porosity, optionally to arrive at a final additively manufactured metal part that is substantially free of porous defects in addition to being substantially crack-free.

The final additively manufactured article may have porosity from 0% to about 75%, such as about 5%, 10%, 20%, 30%, 40%, 50%, 60%, or 70%, in various embodiments. The porosity may derive from space both within particles (e.g., hollow shapes) as well as space outside and between particles. The total porosity accounts for both sources of porosity.

Optionally, porosity may be removed or reduced. For example, a secondary heat and/or pressure (or other mechanical force) treatment may be done to minimize porous voids present in the additively manufactured article. Also, pores may be removed from the additively manufactured article by physically removing (e.g., cutting away) a region into which porous voids have segregated.

In addition to removal of voids, other post-working may be carried out. For example, forging can refine defects and can introduce additional directional strength, if desired. Preworking (e.g., strain hardening) can produce a grain flow oriented in directions requiring maximum strength.

The final additively manufactured article may be selected from the group consisting of a structure, a coating, a geometric object, a billet, an ingot, a net-shape part, a near-net-shape part, a welding filler, and combinations thereof. Essentially, the geometry of an additively manufactured part is unlimited.

As noted previously, the present invention is not limited to the use of the metal-containing functionalized material in additive manufacturing. The metal-containing functionalized material may also be used in one or more techniques selected from the group consisting of injection molding, sintering, capacitive discharge sintering, isostatic pressing, and spark plasma sintering, for example.

Some possible powder metallurgy processing techniques that may be used, beyond additive manufacturing, include hot pressing, cold pressing, low-pressure sintering, extrusion, pressureless sintering, and metal injection molding, for example. Melting may include induction melting, resistive melting, skull melting, arc melting, laser melting, electron beam melting, semi-solid melting, or other types of melting (including convention and non-conventional melt processing techniques). Casting may include centrifugal, pour, gravity, investment, or die casting, for example. Sintering may include spark discharge, capacitive-discharge, resistive, or furnace sintering, for example. Mixing may include convection, diffusion, shear mixing, or ultrasonic mixing, for example.

The principles of the disclosure may be applied to form various functional materials that comprise, consist of, or consist essentially of a metal-containing functionalized material disclosed herein. Exemplary functional materials include, but are not limited to, ferromagnetic materials, ferrimagnetic materials, paramagnetic materials, magnetocaloric materials, magnetorestrictive materials, piezoelectric materials, etc.

EXAMPLES

Example 1

Mechanical Milling of Aluminum Alloy

An unmodified extruded Al-7075 aluminum alloy rod is obtained as a bulk starting material. The Al-7075 rod is mechanically milled using a laboratory-scale planetary mill under ambient conditions. The temperature of the mechanical milling is maintained below the melting point of Al-7075 (477° C.).

Figure 3:
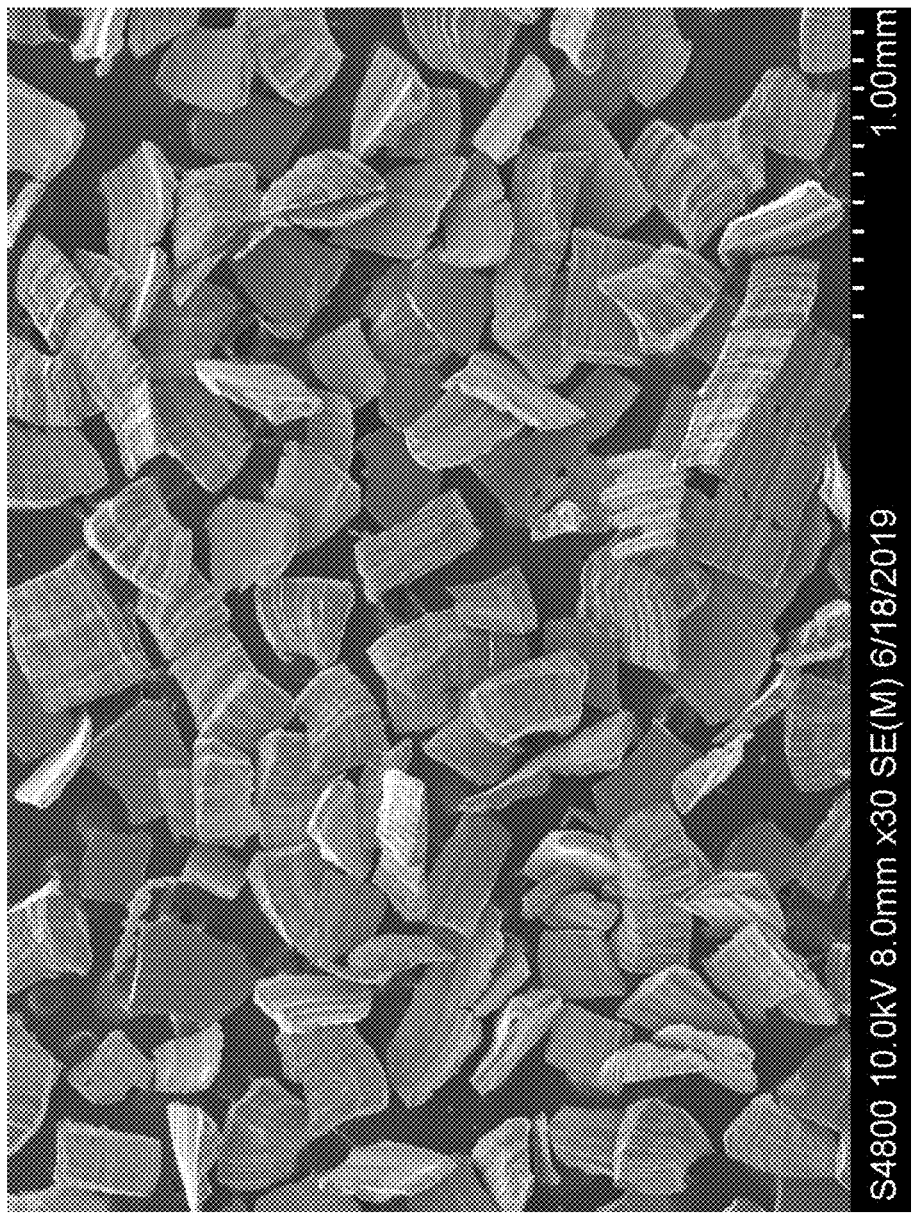
FIG. 3 is a SEM image (scale bar=1 mm) showing individual Al-7075 particles produced from mechanical milling of an extruded rod bulk starting material, in Example 1.

A first experiment is performed with a single milling/grinding step. FIG. 3 is a SEM image (scale bar=1 mm) showing individual Al-7075 particles produced from mechanical milling of an extruded rod bulk starting material. The characteristic dimension of the Al-7075 particles is less than 600 microns. The mechanically milled particles are aspherical.

Figure 4:
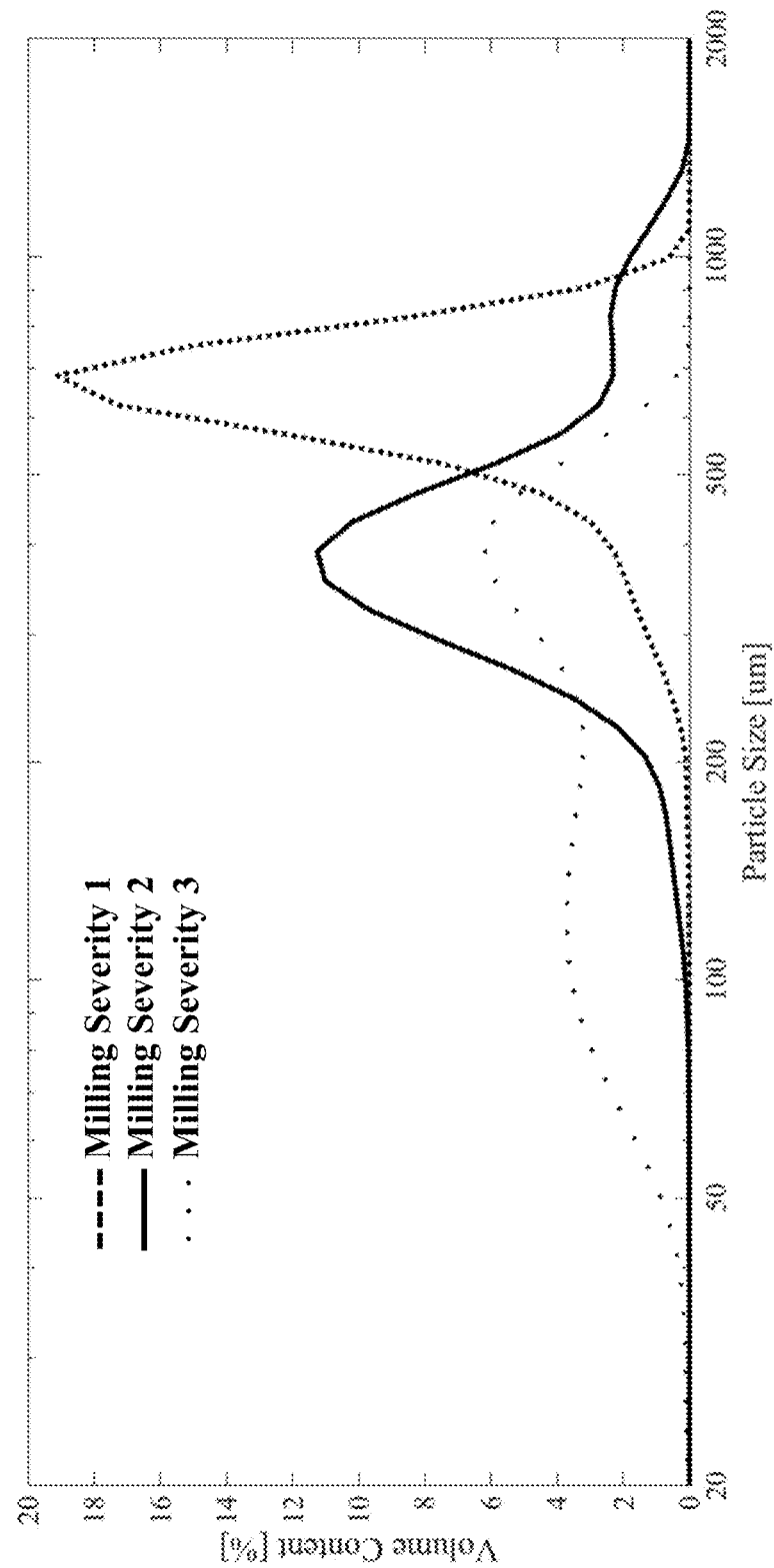
FIG. 4 shows particle-size distributions of mechanically milled Al-7075 particles at different milling severities, in Example 1.

A second experiment is performed in which the milling severity is varied by adjusting parameters of the planetary mill, including number and pitch of grinding teeth, the shear rate, the screen size, and the number of passes. FIG. 4 shows the particle-size distribution of mechanically milled Al-7075 particles at three different milling severities, labeled 1, 2, and 3, which are in order of qualitatively increasing severity. FIG. 4 reveals that the morphology and particle size can be controlled by milling process parameters to control both the size distribution (e.g. Gaussian or unimodal versus bimodal) as well as the median characteristic dimension (D50). In particular, for Milling Severity 1, an approximately Gaussian distribution is observed. For Milling Severity 2, a bimodal distribution is observed, with a primary mode at about 400 microns and a second mode at about 800 microns. For Milling Severity 3, a bimodal distribution is observed, with a primary mode at about 400 microns and a second mode at about 125 microns.

The packing density for the powders in Example 1 is experimentally determined to fall between 49% and 56%.

Example 2

Cryogenic Mechanical Milling of Aluminum Alloy

An unmodified extruded Al-7075 aluminum alloy rod is obtained as a bulk starting material.

The bulk starting material is treated by cryogenic milling (cryomilling) using a laboratory-scale cryogrinder (Retsch GmbH, Haan, Germany). The temperature of the cryomilling is about −195° C., well below the melting point of Al-7075 (477° C.).

Figure 5:
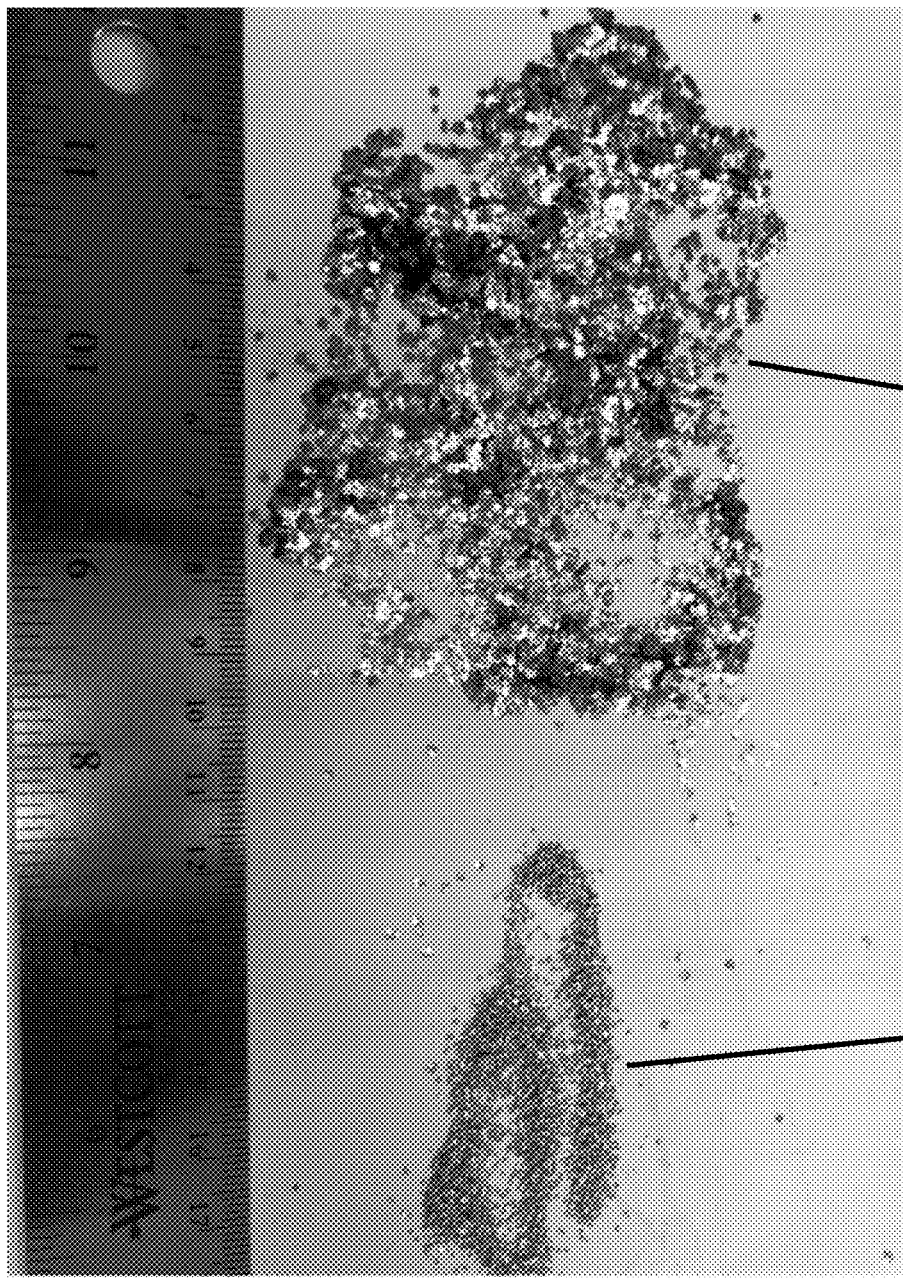
FIG. 5 is a photograph showing individual Al-7075 particles produced from cryomilling of a bulk starting material compared to individual Al-7075 particles produced from mechanical milling of a bulk starting material at ambient temperature, in Example 2.

FIG. 5 is a photograph showing individual Al-7075 particles produced from cryomilling of an extruded rod bulk starting material (left-hand image) compared to individual Al-7075 particles produced from mechanical milling of an extruded rod bulk starting material at ambient temperature (right-hand image; see Example 1). The cryomilled particles are aspherical. Due to reduced ductility, the cryomilled particles have a smaller characteristic size dimension compared to the particles milled at ambient temperature.

Example 3

Chemical Pretreatment Prior to Mechanical Milling of Aluminum Alloy

A bulk starting material consisting of fragments of extruded Al-7075 aluminum alloy rods is obtained.

In order to cause metal embrittlement to reduce ductility, the bulk starting material is exposed to a forming gas ($Ar/H_2$ at a 96/4% volume ratio) using an elevated-temperature furnace at 480° C., to reduce the ductility of the aluminum alloy via hydrogen embrittlement. This pretreatment temperature is below the liquidus temperature (635° C.) of Al-7075 aluminum alloy.

Following hydrogen pretreatment, the bulk material is then mechanically milled at ambient temperature using a laboratory-scale planetary mill.

Figure 6A:
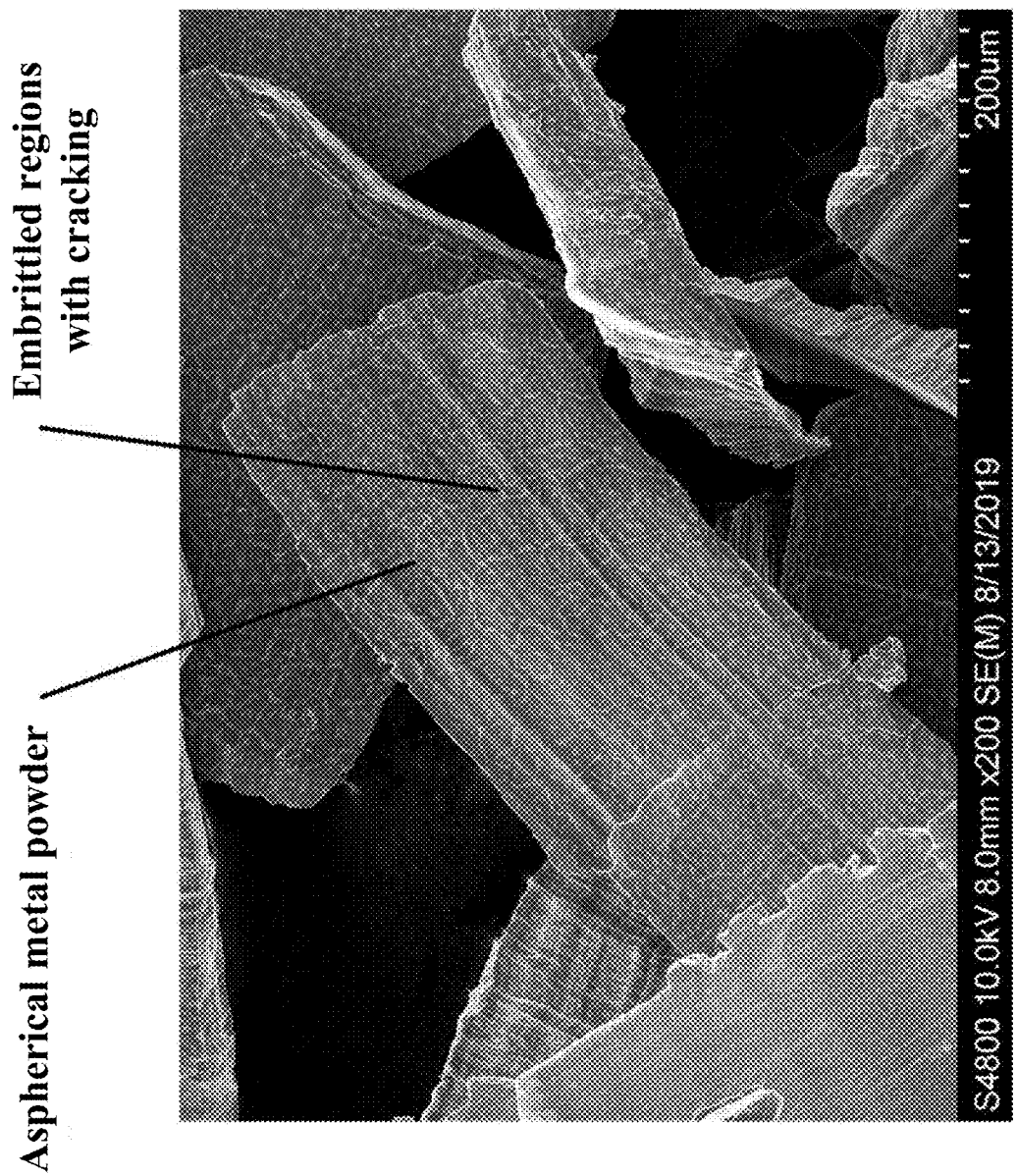
FIG. 6A is a SEM image (scale bar=200 microns) showing individual Al-7075 aspherical particles produced from mechanical milling of a bulk starting material, followed by exposure to the forming gas to form an embrittled material, in Example 3.
Figure 6B:
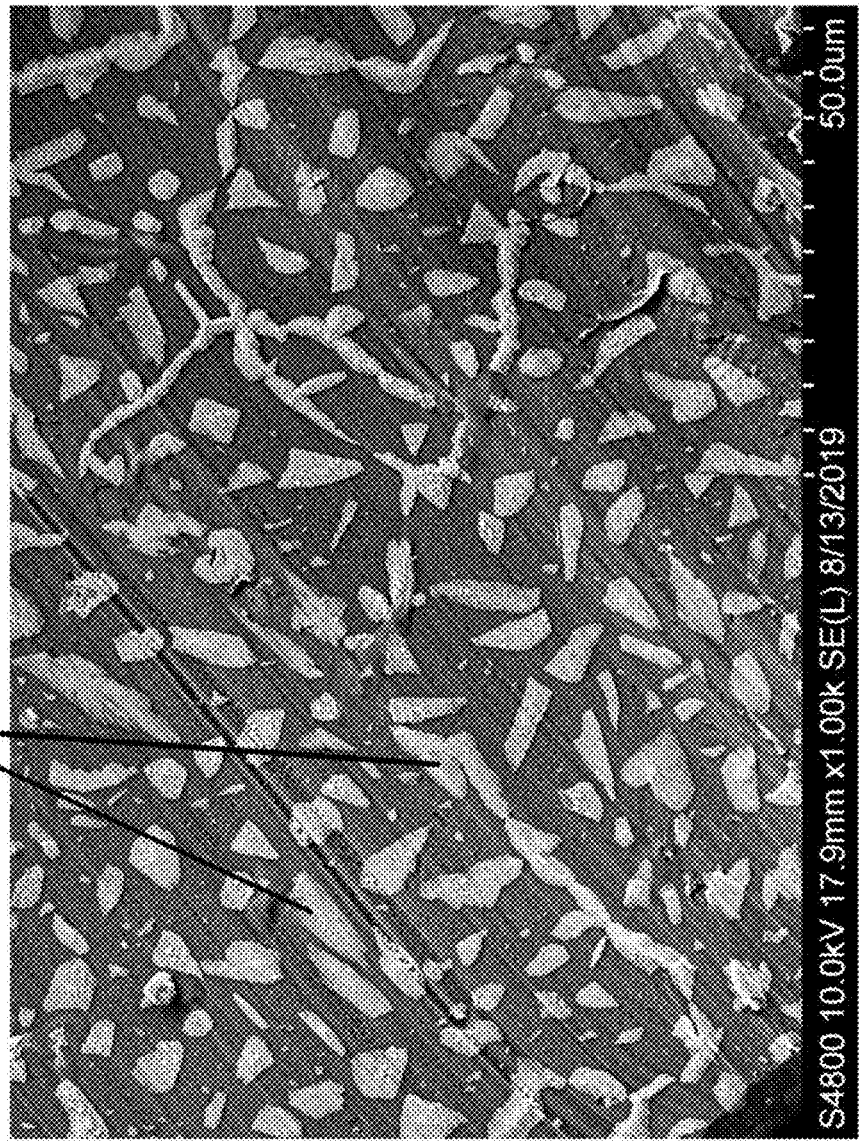
FIG. 6B is a SEM image (scale bar=50 microns) showing individual Al-7075 aspherical particles produced from further mechanical agitation of the embrittled material shown in FIG. 6A, in Example 3.

FIG. 6A is a SEM image (scale bar=200 microns) showing individual Al-7075 aspherical particles produced from exposure to the forming gas followed by mechanical agitation at ambient temperature. FIG. 6B is a SEM image (scale bar=50 microns) showing individual Al-7075 aspherical particles with embrittled regions. FIG. 6B is a zoomed-in version of FIG. 6A.

Heat treatment in the presence of a forming gas embrittles the aspherical metal alloy powder to enable formation of coarse intermetallic phases, which reduces the energy required to mechanically agitate the powder. Formation of brittle intermetallic secondary phases is evident from the image of FIG. 6B.

Example 4

Surface Functionalization of Aspherical Aluminum Alloy Particles

Aluminum alloy aspherical particles are produced according to Example 1 (milling severity 1 in FIG. 4), with particle-size distribution centered within 600-700 microns.

Figure 7A:
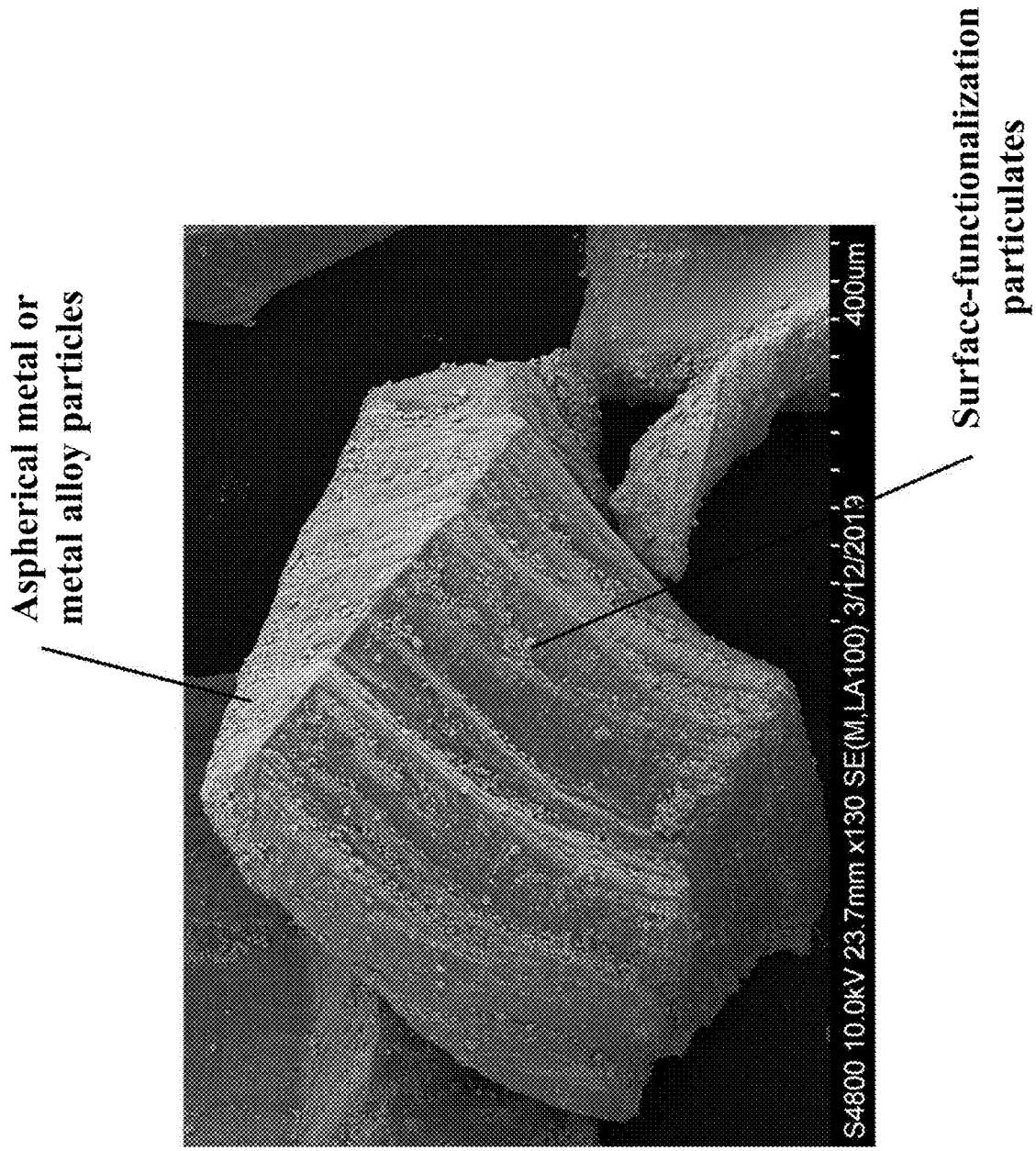
FIG. 7A is a SEM image (scale bar=400 microns) of aluminum alloy particulates functionalized with zirconium hydride ($ZrH_2$) particulates assembled on the surfaces of all Al-7075 aspherical particles, in Example 4.
Figure 7B:
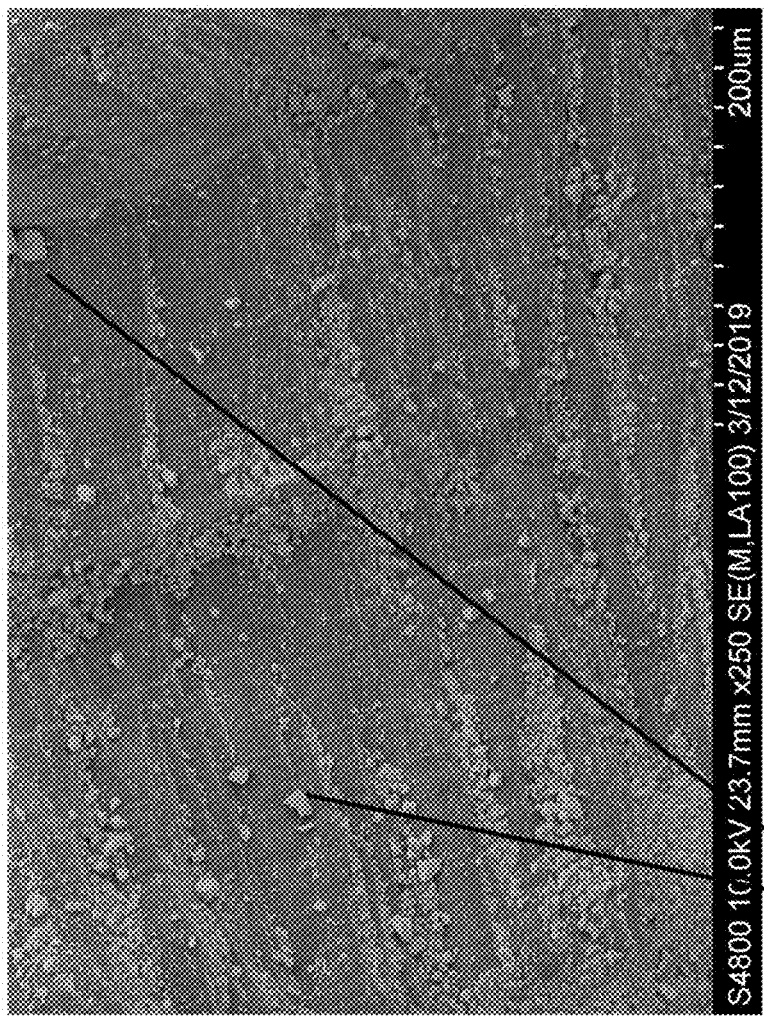
FIG. 7B is a SEM image (scale bar=300 microns) of aluminum alloy particulates functionalized with zirconium hydride ($ZrH_2$) particulates assembled on the surfaces of all Al-7075 aspherical particles, in Example 4.

The aluminum alloy particulates are then functionalized with about 1 vol % zirconium hydride ($ZrH_2$) particulates assembled on the surfaces of all Al-7075 aspherical particles, as revealed in the SEM image of FIG. 7A (scale bar=400 microns) and FIG. 7B (scale bar=200 microns). Relatively uniform coverage of a plurality of $ZrH_2$ particulates on the surfaces of the Al-7075 platelets is observed. The $ZrH_2$ particulates are intended to be inoculants for forming equiaxed grains during additive manufacturing.

Figure 8:
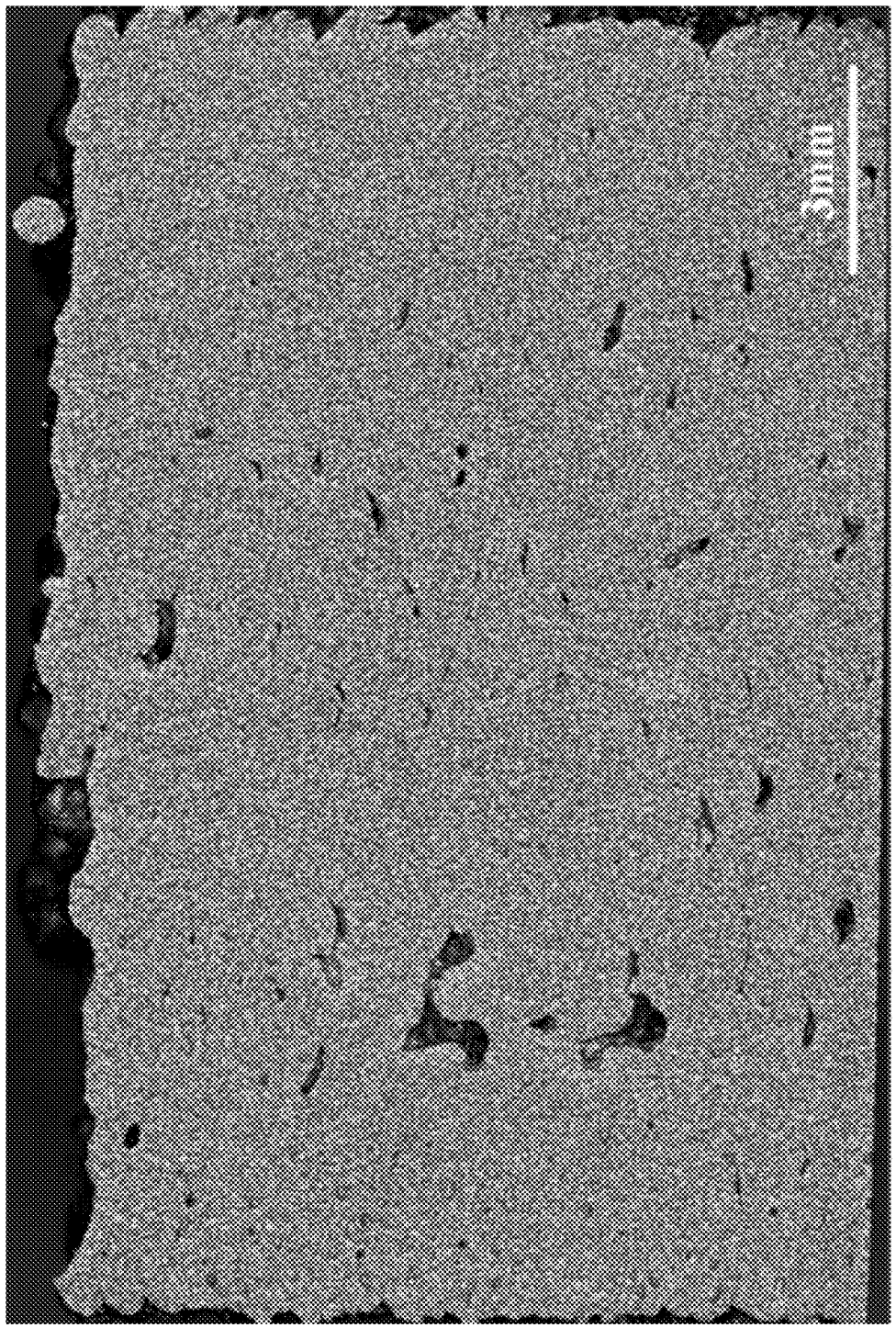
FIG. 8 is a photograph (scale bar=3 mm) of the solidified metal alloy part formed from laser melting and solidification of $ZrH_2$-functionalized Al-7075 aspherical powders, in Example 4.

The resulting functionalized powders are then selectively melted and solidified using a Renishaw 500M commercial powder-based laser metal additive-manufacturing system (Renishaw PLC, New Mills, United Kingdom). FIG. 8 is a photograph (scale bar=3 mm) of the solidified metal alloy part formed from laser melting and solidification of $ZrH_2$-functionalized Al-7075 aspherical powders. Because the functionalized powders melt and resolidify in the additive-manufacturing process, the aspherical nature of the initial particles is no longer present.

Despite minor porosity, the structure is free of solidification cracking that would have been indicative of incomplete or insufficient application of $ZrH_2$ inoculants. That is, FIG. 8 demonstrates that a sufficient concentration and distribution of $ZrH_2$ inoculants is utilized in this example.

In some embodiments, the invention improves on prior-art limitations by providing a means to produce powder for metal additive manufacturing or other powder metallurgy processes without the use of gas or water atomization (i.e., no phase change). In these or other embodiments, the invention improves on prior-art limitations by providing a means of introducing functional particulates to the metal alloy powder to enable alloys that were previously incompatible (e.g., non-weldable) to now be workable in metal additive-manufacturing processes. The present disclosure is by no means limited to reuse of powders or parts that were heretofore compatible with additive manufacturing. Rather, the principles taught herein enable the use of wrought alloy components or scraps which are available in large volumes and low cost.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

This specification hereby incorporates by reference U.S. patent application Ser. No. 15/880,474, filed Jan. 25, 2018, U.S. patent application Ser. No. 15/880,488, filed Jan. 25, 2018, and U.S. patent application Ser. No. 15/880,466, filed Jan. 25, 2018.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A metal-containing functionalized material comprising:
    (a) a plurality of aspherical particles comprising a wrought aluminum alloy, wherein said aspherical particles are produced by a process comprising mechanically milling and/or chemically milling a bulk feedstock containing a bulk wrought metal alloy, wherein said mechanically milling and/or chemically milling causes no solid-liquid phase change during conversion of said bulk wrought aluminum alloy into said aspherical particles; and
    (b) a plurality of particulates that are physically and/or chemically assembled on surfaces of said aspherical particles, wherein said particulates are selected from the group consisting of metals, metal alloys, metal carbides, metal nitrides, metal borides, metal hydrides, metal oxides, metal sulfides, ceramics, and combinations thereof,
    wherein said particulates are compositionally different than said aspherical particles,
    wherein said particulates have an average particulate size that is different than an average aspherical-particle size of said aspherical particles, and
    wherein said aspherical particles are characterized by a packing efficiency selected from 49% to 56%.

2. The metal-containing functionalized material of claim 1, wherein said aspherical particles are selected from whiskers, needles, fractured chips, deformed ribbons, rods, fibers, oblate spheroids, prolate spheroids, parallelepipeds, rhomboids, rectangular prisms, platelets, faceted particles, and/or combinations thereof.

3. The metal-containing functionalized material of claim 1, wherein said aspherical particles are characterized by a median particle size (D50) from 10 microns to 10 millimeters.

4. The metal-containing functionalized material of claim 1, wherein said average particulate size is smaller than said average aspherical-particle size.

5. The metal-containing functionalized material of claim 4, wherein said average particulate size is at least an order of magnitude smaller than said average aspherical-particle size.

6. The metal-containing functionalized material of claim 1, wherein said average particulate size is from 5 nanometers to 100 microns.

7. The metal-containing functionalized material of claim 1, wherein said particulates form a continuous coating on said aspherical particles.

8. The metal-containing functionalized material of claim 1, wherein said particulates form a discontinuous coating on said aspherical particles.

9. The metal-containing functionalized material of claim 1, wherein said aspherical particles contain a metal selected from the group consisting of titanium, cobalt, chromium, iron, copper, tungsten, magnesium, niobium, nickel, tantalum, silicon, vanadium, gold, silver, platinum, palladium, iridium, rhenium, zinc, cerium, molybdenum, zirconium, hafnium, and alloys or combinations thereof.

10. The metal-containing functionalized material of claim 1, wherein said particulates contain a metal selected from the group consisting of aluminum, titanium, cobalt, zinc, tin, chromium, bismuth, neodymium, dysprosium, erbium, samarium, praseodymium, gadolinium, ytterbium, lanthanum, boron, lithium, calcium, strontium, scandium, yttrium, manganese, rhenium, iridium, lead, carbon, indium, gallium, iron, copper, tungsten, magnesium, niobium, nickel, tantalum, silicon, vanadium, gold, silver, palladium, platinum, cerium, zirconium, hafnium; carbides, nitrides, borides, hydrides, intermetallics, oxides, or sulfides thereof; and combinations of the foregoing.

11. The metal-containing functionalized material of claim 1, wherein the combined concentration of said aspherical particles and said particulates is from 50 vol % to 100 vol % of said metal-containing functionalized material.

* * * * *